(12) United States Patent
Nakaoka et al.

(10) Patent No.: US 9,586,488 B2
(45) Date of Patent: Mar. 7, 2017

(54) BRAKE APPARATUS

(71) Applicants: Hiroshi Nakaoka, Okazaki (JP); Kei Sato, Kasugai (JP); Kazunori Nimura, Toki (JP); Kentaro Oya, Okazaki (JP); Takeshi Ishida, Nagakute (JP); Masaki Nanahara, Toyota (JP); Tsuyoshi Yamasaki, Toyota (JP); Yoshito Tanaka, Miyoshi (JP); Masayasu Ohkubo, Okazaki (JP)

(72) Inventors: Hiroshi Nakaoka, Okazaki (JP); Kei Sato, Kasugai (JP); Kazunori Nimura, Toki (JP); Kentaro Oya, Okazaki (JP); Takeshi Ishida, Nagakute (JP); Masaki Nanahara, Toyota (JP); Tsuyoshi Yamasaki, Toyota (JP); Yoshito Tanaka, Miyoshi (JP); Masayasu Ohkubo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/892,758

(22) PCT Filed: May 21, 2013

(86) PCT No.: PCT/JP2013/064116
§ 371 (c)(1),
(2) Date: Nov. 20, 2015

(87) PCT Pub. No.: WO2014/188516
PCT Pub. Date: Nov. 27, 2014

(65) Prior Publication Data
US 2016/0096434 A1 Apr. 7, 2016

(51) Int. Cl.
*B60L 7/26* (2006.01)
*B60T 8/176* (2006.01)
(Continued)

(52) U.S. Cl.
CPC .............. *B60L 7/26* (2013.01); *B60L 3/102* (2013.01); *B60L 3/108* (2013.01); *B60L 7/18* (2013.01);
(Continued)

(58) Field of Classification Search
CPC ........ B60F 19/00; B60W 20/00; B60W 30/18
(Continued)

(56) References Cited

U.S. PATENT DOCUMENTS 7,489,994 B2 * 2/2009 Isono ................. F02D 41/1401
340/438
2011/0285198 A1 * 11/2011 Nakata .................. B60K 6/445
303/3

(Continued)

FOREIGN PATENT DOCUMENTS

| JP | 11 78839 | 3/1999 |
|---|---|---|
| JP | 2000 184505 | 6/2000 |
| WO | 2010 119889 | 10/2010 |

OTHER PUBLICATIONS

International Search Report Issued Jul. 9, 2013 in PCT/JP13/064116 Filed May 21, 2013.

*Primary Examiner* — Thomas G Black
*Assistant Examiner* — Wae Louie
(74) *Attorney, Agent, or Firm* — Oblon, McClelland, Maier & Neustadt, L.L.P.

(57) ABSTRACT

A first ECU estimates whether the operation of a second actuator has been started, based on the variation of the hydraulic pressure with respect to the flow rate of hydraulic fluid outputted from a first actuator. Even in a case where the operation information of the second actuator is not received, the first ECU sets the control mode to a simultaneous operation mode, when it is estimated that the operation of the second actuator has been started. In the simultaneous operation mode, a controlled parameter of linear control (Continued)

valves on assumption that the second actuator is operating is set up, and a stop instruction of regenerative braking is transmitted to a hybrid ECU.

6 Claims, 13 Drawing Sheets

(51) Int. Cl.
    *B60T 8/1755* (2006.01)
    *B60L 3/10* (2006.01)
    *B60L 11/14* (2006.01)
    *B60L 15/20* (2006.01)
    *B60L 7/18* (2006.01)
    *B60W 10/08* (2006.01)
    *B60W 10/188* (2012.01)
    *B60W 10/192* (2012.01)
    *B60W 30/18* (2012.01)

(52) U.S. Cl.
    CPC ........... *B60L 11/14* (2013.01); *B60L 15/2009* (2013.01); *B60T 8/176* (2013.01); *B60T 8/1755* (2013.01); *B60W 10/08* (2013.01); *B60W 10/188* (2013.01); *B60W 10/192* (2013.01); *B60W 30/18127* (2013.01); *B60L 2240/12* (2013.01); *B60L 2240/22* (2013.01); *B60L 2240/461* (2013.01); *B60L 2240/465* (2013.01); *B60L 2250/26* (2013.01); *B60T 2270/602* (2013.01); *B60T 2270/604* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
    USPC ............................... 701/22, 31.4, 36, 37, 70
    See application file for complete search history.

(56) References Cited

U.S. PATENT DOCUMENTS

| | | | |
|---|---|---|---|
| 2012/0062023 A1* | 3/2012 | Ohkubo | B60T 7/042 303/3 |
| 2012/0199437 A1* | 8/2012 | Okuda | B60K 6/48 192/85.63 |
| 2013/0197771 A1* | 8/2013 | Takeda | B60T 13/745 701/70 |
| 2014/0305751 A1* | 10/2014 | Yamamoto | B60T 8/00 188/72.4 |
| 2015/0114770 A1* | 4/2015 | Arrigoni | B60T 13/745 188/106 F |
| 2016/0039292 A1* | 2/2016 | Takahashi | B60W 10/08 701/70 |

* cited by examiner

BRAKE APPARATUS

TECHNICAL FIELD

The present invention relates to a brake apparatus applied to a vehicle comprising a regenerative braking device which generates regenerative braking force.

BACKGROUND ART

Conventionally, a brake apparatus applied to a vehicle comprising a regenerative braking device which generates regenerative braking force by converting a kinetic energy of a wheel into an electrical energy and collecting the electrical energy into a battery has been known. This brake apparatus comprises a disc brake unit disposed in each wheel, a hydraulic pressure control actuator which controls a hydraulic pressure of a wheel cylinder disposed in the disc brake unit, and an electronic control unit (hereafter, an electronic control unit is referred to as an ECU) which controls an operation of the hydraulic pressure control actuator, in order to generate braking force for covering shortfall of regenerative braking force with friction braking force. The hydraulic pressure control actuator comprises a power hydraulic pressure source having a pump and an accumulator and a control valve for adjusting a hydraulic pressure which the power hydraulic pressure source outputs, etc., for example. The ECU calculates target total braking force for a wheel based on the amount of a brake operation, and sets braking force obtained by subtracting regenerative braking force generated with the regenerative braking device from target total braking force as target friction braking force. Then, the operation of the hydraulic pressure control actuator is controlled so that the hydraulic pressure of the wheel cylinder follows target hydraulic pressure which is set corresponding to the target friction braking force. Such a brake control performed in coordination with a regenerative braking device is referred to as a regeneration coordination brake control.

Moreover, generally, such a brake apparatus also has a function for performing an antilock control (referred to as ABS) which suppresses the lock of the wheel at the time of braking.

Typically, a regeneration coordination brake control and an ABS control are carried out by one hydraulic pressure actuator and one ECU which controls the hydraulic pressure actuator. On the contrary, it is known that the hydraulic pressure control actuator and ECU are respectively divided by functions.

For instance, the brake apparatus proposed in Patent Document 1 (PTL1) separately comprises two actuators of a regeneration coordination actuator and an ABS actuator. Moreover, also as for ECUs, it separately comprises a regeneration coordination ECU which controls an operation of the regeneration coordination actuator and an ABS-ECU which controls an operation of the ABS actuator. The ABS-ECU transmits an ABS operation signal to the regeneration coordination ECU, when carrying out an ABS control. The regeneration coordination ECU performs a regenerative braking demand to an ECU of a regenerative braking device when a brake operation is detected, but stops a regeneration coordination brake control so that the regeneration coordination brake control does not interfere with the ABS control when the ABS operation signal is received.

CITATION LIST

Patent Literature

[PTL1] Japanese Patent Application Laid-Open (kokai) No. 2000-184505

SUMMARY OF INVENTION

However, a time delay after the ABS-ECU transmits the ABS operation signal until the regeneration coordination ECU receives the ABS signal arises. The time delay is large especially when using a CAN (Controller Area Network) communication system which connects a plurality of ECUs in a vehicle in a mutually communicable manner. When such a time delay arises, a treatment for stopping regenerative braking to shift to a brake control only by friction braking will be delayed.

Moreover, during a period from a start of the ABS control until the ABS operation signal is received by the regeneration coordination ECU, the hydraulic pressure vibrates within the regeneration coordination actuator and, by the vibration, a pressure-increasing operation by a pressure-increasing control valve and a pressure-reducing operation by a pressure-reducing control valve are repeated in turns by the action of a hydraulic pressure control. For instance, in the ABS actuator, when the ABS control is started, an on-off valve disposed in a hydraulic pressure passage to the wheel cylinder of a wheel as a subject for the ABS control is closed. Thereby, the hydraulic pressure in the regeneration coordination actuator may rise suddenly. In this case, a pressure-reducing control valve operates to decrease the pressure, in accordance with the hydraulic pressure control by regeneration coordination ECU. Since the pressure-increasing valve and pressure-reducing valve disposed in the regeneration coordination actuator are usually controlled in a status that the regeneration coordination actuator and the wheel cylinder are communicated with each other, the controlled parameter is set up on the basis of the status. However, since the volume of a hydraulic fluid passage, to which the hydraulic fluid is supplied from the pressure-increasing control valve and the pressure-reducing control valve, has been decreased in the status that the above-mentioned on-off valve is closed, hydraulic pressure rigidity in the passage changes, and a change of the hydraulic pressure becomes large with respect to the operations of the pressure-increasing control valve and the pressure-reducing control valve. For this reason, a value of hydraulic pressure detected by a sensor vibrates up and down with respect to target hydraulic pressure, and the pressure-increasing control valve and the pressure-reducing control valve operate in turns in a short period. Thereby, a problem that operating noise becomes loud arises. Moreover, there is also a possibility that it may become impossible to supply proper hydraulic pressure to the ABS actuator and the stopping distance of the vehicle may become long.

When carrying out the regeneration coordination brake control and the ABS control by one ECU, the control mode of the control valves can be switched by a processing in the ECU, depending on whether the ABS control is carried out or not. However, in a configuration wherein an ECU which carries out the ABS control and an ECU which carries out the regeneration coordination brake control are separately prepared, there are problems as mentioned above during a period until the operation information of the ABS is transmitted to the regeneration coordination ECU.

The present invention intends to solve a problem due to a time delay in communication in a configuration wherein an ECU which carries out a regeneration coordination brake control and an ECU which carries out a brake control for maintaining a stability of a vehicle, such as an ABS, are prepared separately.

A feature of the present invention which solves the above-mentioned problem is in a brake apparatus applied to a vehicle comprising a regenerative braking device (10) to generate regenerative braking force by converting a kinetic energy of a rotating wheel into an electrical energy and collecting the electrical energy to a battery, comprising:

a master cylinder (42) which outputs a hydraulic pressure of a hydraulic fluid according to a brake operation by a driver, a wheel cylinder (52) which is disposed for each wheel and operates a friction member with the hydraulic pressure of the hydraulic fluid to generate friction braking force, a first actuator (110) which is disposed in a passage of the hydraulic fluid between said master cylinder and said wheel cylinder and can adjust the hydraulic pressure supplied to said wheel cylinder, a first electronic control unit (120) which sets up target hydraulic pressure so that the sum of said regenerative braking force and said friction braking force becomes equal to target total braking force set up according to the amount of a brake operation, and controls an operation of said first actuator so that the outputted hydraulic pressure of said first actuator follows said target hydraulic pressure, a second actuator (210) which is disposed in a passage of the hydraulic fluid between said first actuator and said wheel cylinder, supplies the hydraulic pressure outputted from said first actuator to said wheel cylinder as it is when being not in operation, and can individually adjust the hydraulic pressure of each wheel cylinder when being in operation, a second electronic control unit (220) which controls an operation of said second actuator to carry out an antilock control for suppressing the lock of a wheel at least, and a communication connection means (300) to connect said first electronic control unit and said second electronic control unit so that they can communicate each other, and said first electronic control unit changes the control mode into a control mode on the assumption that said second actuator is operating, when said first electronic control unit receives operation information which shows that said second actuator is operating and is transmitted from said second electronic control unit, wherein:

said first electronic control unit comprises an early control mode changing means (S17, S30) for changing the control mode into said control mode on the assumption that said second actuator is operating, without waiting for the reception of said operation information, when the variation of the outputted hydraulic pressure of said first actuator is a value which cannot happen while said second actuator is not operating.

The brake apparatus according to the present invention comprises the first actuator which is disposed in the passage of the hydraulic fluid between the master cylinder and the wheel cylinder and can adjust the hydraulic pressure supplied to the wheel cylinder, and the second actuator which is disposed in the passage of the hydraulic fluid between the first actuator and the wheel cylinder and can individually adjust the hydraulic pressure of each wheel cylinder. The first actuator is controlled by the first electronic control unit, and the second actuator is controlled by the second electronic control unit. The first electronic control unit sets up target hydraulic pressure so that the sum of the regenerative braking force and the friction braking force becomes equal to the target total braking force set up according to the amount of a brake operation, and controls the operation of the first actuator so that the outputted hydraulic pressure of the first actuator follows the target hydraulic pressure. That is, the first electronic control unit controls the operation of the first actuator, and carries out a regeneration coordination brake control. On the other hand, the second electronic control unit controls the operation of the second actuator, and carries out an antilock control which suppresses the lock of a wheel at least.

The first electronic control unit and the second electronic control unit are connected so as to be able to communicate with each other by the communication connection means. The first electronic control changes the control mode into the control mode on the assumption that the second actuator is operating, when the operation information transmitted from the second electronic control unit and showing that the second actuator is in operation is received. For instance, the first electronic control unit carries out a treatment for reducing the regenerative braking by the regenerative braking device so that the antilock control is not interfered with by the regenerative braking, when the operation information of the second actuator is received.

However, when a time delay after the operation information of the second actuator is transmitted until it is received by the first electronic control unit arises, the first electronic control unit cannot promptly detect the start of the operation of the second actuator. For this reason, in the first electronic control unit, a delay arises in changing into a control mode on the assumption that the second actuator is operating, such as a treatment for reducing the regenerative braking by the regenerative braking device, etc.

Then, in the present invention, the first electronic control unit comprises the early control mode changing means. The early control mode changing means changes the control mode into a control mode on the assumption that the second actuator is operating, without waiting for the reception of the operation information, when the variation of the outputted hydraulic pressure of the first actuator is a value which cannot happen while the second actuator is not operating. For instance, since the passage of the hydraulic fluid, which leads from the first actuator to the wheel cylinder, is temporarily intercepted when an antilock control is carried out by the second actuator, the hydraulic pressure rigidity in the passage of the hydraulic fluid in the supply destination of the hydraulic fluid from the first actuator changes. For this reason, a situation where the variation of the outputted hydraulic pressure of the first actuator becomes a value which cannot happen while the second actuator is not operating occurs. Therefore, even though the first electronic control unit does not receive the operation information of the second actuator, the first electronic control unit can judge that the second actuator is operating based on the fluctuation of the outputted hydraulic pressure of the first actuator. As a result, in accordance with the present invention, it is possible to change the control mode into the control mode on the assumption that the second actuator is operating at an early stage.

Another feature of the present invention is in that the brake apparatus comprises an operation start estimation means (S61 to S69) to estimate that the operation of said second actuator is started when the variation of the hydraulic pressure with respect to the flow rate of the hydraulic fluid outputted from said first actuator becomes a value which cannot happen while said second actuator is not operating, and said early control mode changing means changes the control mode into said control mode on the assumption that said second actuator is operating when said operation start estimation means estimates that the operation of said second actuator is started.

When the second actuator operates and the passage of the hydraulic fluid which leads to the wheel cylinder from the first actuator is intercepted temporarily, the hydraulic pressure rigidity in the passage of the hydraulic fluid in the supply destination of the hydraulic fluid from the first actuator changes. Therefore, as compared with a case where the second actuator is not operating, the variation of the hydraulic pressure with respect to the flow rate of the hydraulic fluid outputted from the first actuator becomes large. Using this, the operation start estimation means estimates that the operation of the second actuator is started, when the variation of the hydraulic pressure with respect to the flow rate of the hydraulic fluid outputted from the first actuator is a value which cannot happen while the second actuator is not operating. Therefore, it is possible to easily estimate that the operation of the second actuator is started.

Another feature of the present invention is in that said operation start estimation means judges whether the variation of the hydraulic pressure with respect to the flow rate of the hydraulic fluid outputted from said first actuator is larger than an assumed maximum value of the variation of the hydraulic pressure with respect to the flow rate of the hydraulic fluid outputted from said first actuator in a status that said first actuator and said wheel cylinder are communicating with each other and, based on the judgment result, estimates whether the operation of said second actuator has been started.

In the present invention, in a situation where the variation of the hydraulic pressure with respect to the flow rate of the hydraulic fluid outputted from the first actuator is larger than the assumed maximum value of the variation of the hydraulic pressure with respect to the flow rate of the hydraulic fluid outputted from the first actuator in the status that the first actuator and the wheel cylinder are communicating with each other, it is estimated that the operation of the second actuator has been started. Therefore, it is possible to easily estimate that the operation of the second actuator has been started.

Another feature of the present invention is in that said first electronic control unit carries out a treatment for reducing the regenerative braking by said regenerative braking device by changing the control mode into said control mode on the assumption that said second actuator is operating (S35).

In accordance with the present invention, the treatment for reducing the regenerative braking by said regenerative braking device can be carried out, without waiting for the reception of the operation information of the second actuator. Thereby, an antilock control can be carried out properly.

Another feature of the present invention is in that said first electronic control unit increases said target hydraulic pressure by changing the control mode into said control mode on the assumption that said second actuator is operating (S36).

In accordance with the present invention, the target hydraulic pressure can be increased at an early stage, without waiting for the reception of the operation information of the second actuator. By this increased target hydraulic pressure, can maintain a status that the first actuator is increasing the outputted hydraulic pressure can be maintained for a long time. Therefore, the first actuator can be prevented from repeating the pressure-increasing operation and the pressure-reducing operation in a short period. Thereby, reduction of the operating noise and improvement in durability of the first actuator can be attained. Moreover, since the outputted hydraulic pressure of the first actuator is increased early, a stopping distance of a vehicle at the time of the antilock control can be shortened.

Another feature of the present invention is in that said first actuator comprises a power hydraulic pressure generator (70) which comprises a pump and an accumulator and outputs high-pressure hydraulic pressure, a linear control valve (77Fr, 78Fr, 77Rr and 78Rr) which adjusts and outputs the hydraulic pressure outputted from said power hydraulic pressure generator, and a pressure sensor (123Fr and 123Rr) which detects the hydraulic pressure adjusted by said linear control valve, and said first electronic control unit acquires a detection hydraulic pressure detected by said pressure sensor, carries out the drive control of said linear control valve with a current according to the deviation between said detection hydraulic pressure and said target hydraulic pressure, and changes a controlled parameter so that switching between a pressure-increasing operation and a pressure-reducing operation of said linear control valve is suppressed as compared with the previous control mode, by changing the control mode into said control mode on the assumption that said second actuator is operating (S32, S33 and S35).

In accordance with the present invention, when it is estimated that the operation of the second actuator is started, the first electronic control unit changes controlled parameter with which switching between the pressure-increasing operation and the pressure-reducing operation of the linear control valve is suppressed as compared with the previous control mode. For instance, in case of a configuration wherein drive control of the linear control valve is carried out so that the detection hydraulic pressure approaches the target hydraulic pressure when the absolute value of the deviation between the detection hydraulic pressure and the target hydraulic pressure exceeds a control start threshold value, this control start threshold value is changed larger. In this case, a dead band spreads and switching between the pressure-increasing operation and the pressure-reducing operation of the linear control valve is suppressed. Moreover, for example, a low-pass-filter treatment of the detection hydraulic pressure value may be started, or the cut-off frequency in the low-pass-filter treatment of the detection hydraulic pressure value may be lowered. Moreover, for example, the control gain of the linear control valve may be changed. As a result, without waiting for the reception of the operation information of the second actuator, a proper hydraulic pressure control of the first suitable actuator can be started at an early timing, and reduction of the operating noise of the linear control valve prepared in the first actuator and improvement in the durability of the linear control valve can be attained. Moreover, stable hydraulic pressure can be supplied to the second actuator. Therefore, a behavior a vehicle can be stabilized successfully.

In addition, in the above-mentioned explanation, in order to help understanding of invention, reference signs used in embodiments are attached in parenthesis to configurations of the present invention corresponding to the embodiments, but each constituent elements of the present invention are not limited to the embodiments specified with the above-mentioned reference signs.

DESCRIPTION OF EMBODIMENTS

Figure 1:
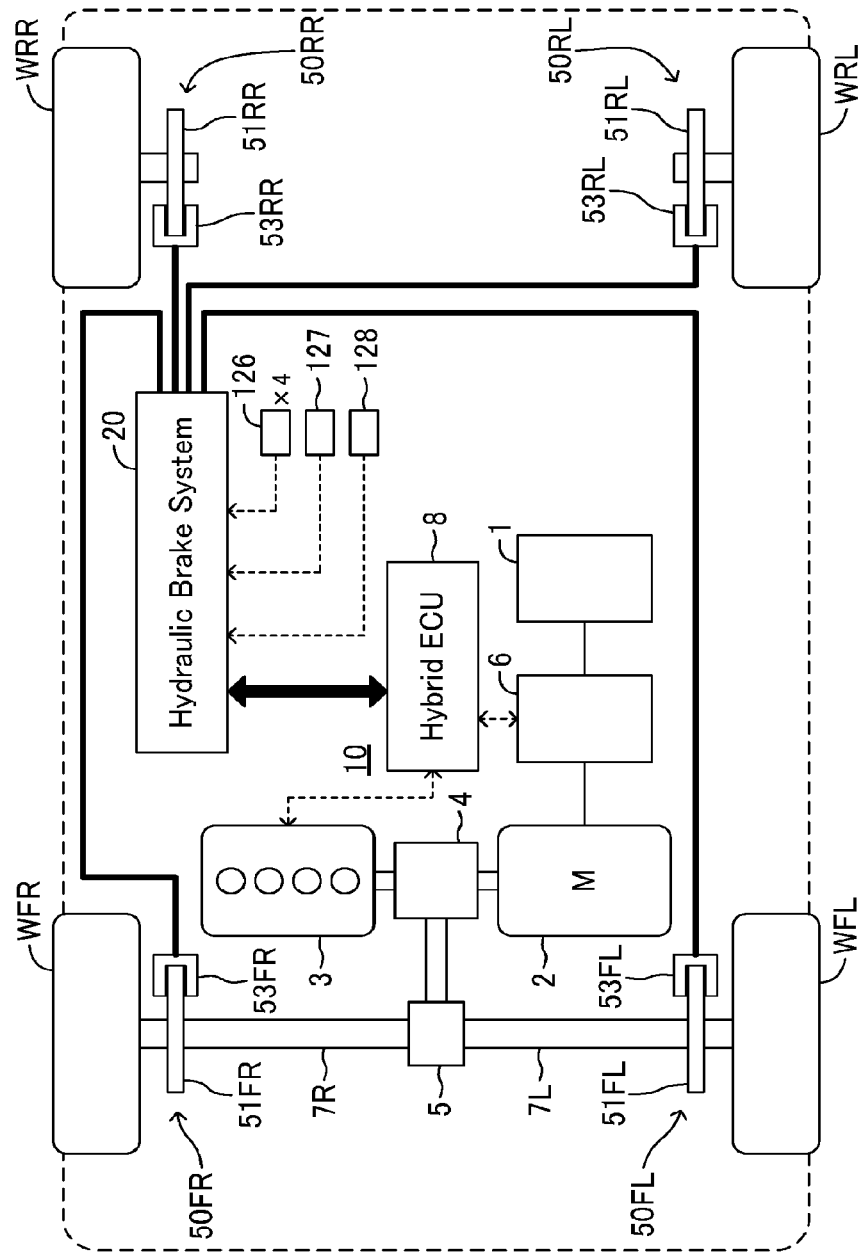
FIG. 1 is a schematic configuration diagram of a regeneration coordination brake control apparatus according to the present embodiment.

Hereafter, a brake apparatus for a vehicle according to one embodiment of the present invention will be explained using drawings. FIG. 1 is a schematic structure of a regeneration coordination brake apparatus comprising a brake apparatus according to the present embodiment.

The brake apparatus according to the present embodiment is applied to a front-wheel-drive-type hybrid vehicle comprising a hybrid system 10 which controls two kinds of power sources, i.e., a motor 2 to which an electric power is supplied from a battery 1 and a gasoline engine 3. In the hybrid system 10, the motor 2 can be used not only as a driving power source, but regenerative braking force can be generated on front, left and right wheels WFL and WFR by using a kinetic energy of a wheel to rotate the motor 2 to generate electricity and collecting the generated electric power in the battery 1. The hybrid vehicle comprises a hydraulic brake system 20 which generates friction braking force on the front, left and right wheels WFL and WFR and rear, left and right wheels WRL and WRR so that the insufficiency of regenerative braking force generated in the hybrid system 10 is compensated. This hydraulic brake system 20 corresponds to a brake apparatus according to the present invention.

In the hybrid system 10, an output shaft of the gasoline engine 3 and an output shaft of the motor 2 are connected with a planetary gear 4. Rotation of an output shaft of the planetary gear 4 is transmitted to left and right axle shafts 7L and 7R for the front wheels through reduction gears 5 and, thereby, the left and right front wheels WFL and WFR are driven to rotate. The motor 2 is connected to the battery 1 through an inverter 6.

The drive control of the motor 2 and the gasoline engine 3 is carried out by a hybrid electronic control unit 8 (referred to as a hybrid ECU8). The hybrid ECU8 is a controller which comprises a microcomputer as its principal part and has an input/output interface, a drive circuit, a communication interface, etc., and it is connected with a the hydraulic brake system 20 in a mutually communicable manner. The hybrid ECU8 carries out the drive control of the gasoline engine 3 and the motor 2 based on the signal from the sensor (not shown) which detects the amount of stepping-on of an accelerator pedal, a position of a shift lever, the charge status of the battery, etc.

Moreover, when a regenerative braking demand instruction transmitted from the hydraulic brake system 20 is received, the hybrid ECU8 operates the motor 2 as a dynamo to generate regenerative braking force. That is, by transmitting a kinetic energy of a rotating wheel to the output shaft of the motor 2 through the axle shafts 7L and 7R for front wheels, the reduction gears 5, and the planetary gear 4 to rotate the motor 2, the motor 2 is made to generate electricity, and the battery 1 is made to collect the generated electric powers through the inverter 6. Braking torque generated by the motor 2 at this time is used as braking torque for the front wheels WFL and WFR.

Figure 2:
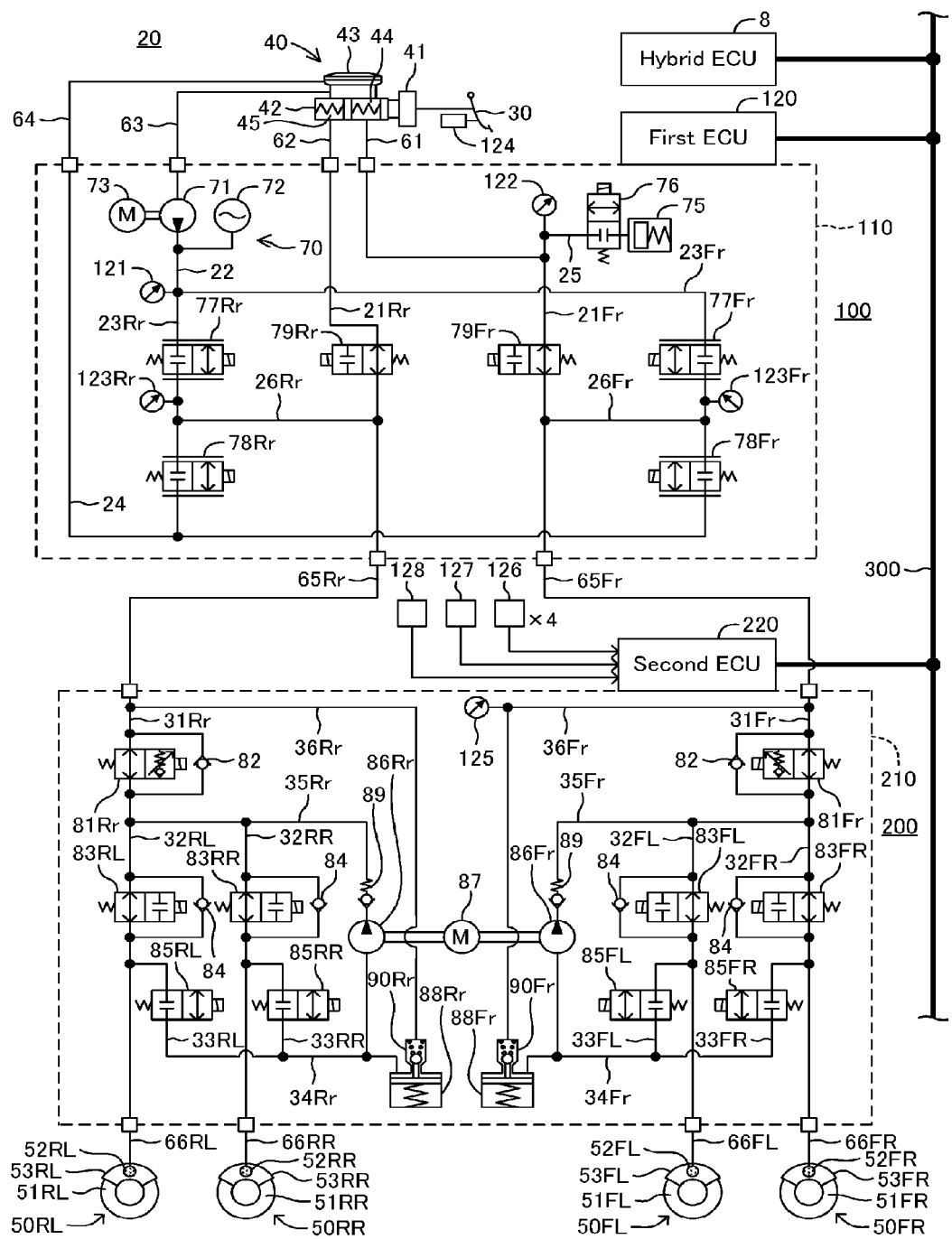
FIG. 2 is a schematic configuration diagram of a hydraulic brake system.

As shown in FIG. 2, the hydraulic brake system 20 comprises a brake pedal 30, a master cylinder unit 40, a first hydraulic pressure control unit 100, a second hydraulic pressure control unit 200, and disc brake units 50FR, 50FL, 50RR and 50RL disposed in each wheel, respectively. The first hydraulic pressure control unit 100 comprises a first actuator 110 for hydraulic pressure control (hereafter, referred to as a first actuator 110) and a first electronic control unit 120 (hereafter, referred to as a first ECU120). The second hydraulic pressure control unit 200 comprises a second actuator 210 for hydraulic pressure control (hereafter, referred to as a second actuator 210) and a second electronic control unit 220 (hereafter, referred to as a second ECU220). The first hydraulic pressure control unit 100 and the second hydraulic pressure control unit 200 are disposed separately from each other. The disc brake units 50FR, 50FL, 50RR and 50RL comprise brake disc rotors 51FR, 51FL, 51RR and 51RL, and brake calipers 53FR, 53FL, 53RR and 53RL. The brake calipers 53FR, 53FL, 53RR and 53RL are provided with wheel cylinders 52FR, 52FL, 52RR and 52RL.

In the present specification, "FL" is given to a reference sign for a member relevant to braking of a front left wheel, "FR" is given to a reference sign for a member relevant to braking of a front right wheel, "RL" is given to a reference sign for a member relevant to braking of a rear left wheel, and "RR" is given to a reference sign for a member relevant to braking of a rear right wheel. Moreover, "Fr" is given to a reference sign for a member relevant to braking of left and right front wheels, and "Rr" is given to a reference sign for a member relevant to braking of left and right rear wheels. Moreover, when a wheel location does not need to be pinpointed in an explanation, "FL", "FR", "RL", "RR", "Fr" and "Rr" may be omitted.

Each wheel cylinder 52 is connected to the second actuator 210 disposed in the second hydraulic pressure control unit 200, and the hydraulic pressure of the hydraulic fluid supplied from the second actuator 210 is transmitted. Each wheel cylinder 52 is operated with the hydraulic pressure of the supplied hydraulic fluid, pushes a brake pad (friction member) against a brake disc rotor 51 rotating along with a wheel W, and generates braking force at the wheel W.

The master cylinder unit 40 comprises a booster 41, a master cylinder 42, and a master reservoir 43. The booster 41 assists stepping-on operation force on the brake pedal 30 at a predetermined rate using air pressure (negative pressure) in an intake pipe at the time of an operation of an engine which is not shown, and transmits the assisted operation force to the master cylinder 42, for example. The master cylinder 42 comprises a first pressure-increasing chamber 44 and a second pressure-increasing chamber 45. The master cylinder 42 pressurizes the hydraulic fluid by a pressure-increasing piston moving forward with the assisted stepping-on operation force of the brake pedal 30 and generates independent master cylinder pressure in the first pressure-increasing chamber 44 and the second pressure-increasing chamber 45, respectively. The first pressure-increasing chamber 44 supplies the generated master cylinder pressure to the first actuator 110 through a first master piping 61. The second pressure-increasing chamber 45 supplies the generated master cylinder pressure to the first actuator 110 through a second master piping 62. The master cylinder pressure of the first pressure-increasing chamber 44 and the master cylinder pressure of the second pressure-increasing chamber 45 become an equal value. The master reservoir 43 is disposed in the upper part of the master cylinder 42, and stores the hydraulic fluid with an atmospheric pressure. The master cylinder 42 is configured so that the first pressure-increasing chamber 44 and the second pressure-increasing chamber 45 communicate with the master reservoir 43 while the stepping-on operation of the brake pedal 30 is released and the pressure-increasing piston is moving backward. Moreover, the master reservoir 43 is connected to the first actuator 110 through a supply piping 63 and a return piping 64.

The first actuator 110 comprises a power hydraulic pressure generator 70. The power hydraulic pressure generator 70 comprises a pump 71 and an accumulator 72. An intake of the pump 71 is connected to the supply piping 63, an exhaust of the pump 71 is connected to the accumulator 72, and the pump 71 pressurizes the hydraulic fluid by driving a motor 73. The accumulator 72 converts pressure energy of the hydraulic fluid pressurized by the pump 71 into pressure energy of sealed gas, such as nitrogen, and stores it.

The first actuator 110 comprises a main passage 21Fr connected to the first master piping 61, a main passage 21Rr connected to the second master piping 62, a main hydraulic pressure source passage 22 which is a passage where the power hydraulic pressure generator 70 outputs high hydraulic pressure, a branch hydraulic pressure source passage 23Fr and a branch hydraulic pressure source passage 23Rr which are disposed by branching into two from the main hydraulic pressure source passage 22, and a return passage 24 connected to the return piping 64. The main passage 21Fr is connected to the second actuator 210 through a connection piping 65Fr. The main passage 21Rr is connected to the second actuator 210 through a connection piping 65Rr.

In the middle of the main passage 21Fr, a master cut valve 79Fr is disposed. In the middle of the main passage 21Rr, a master cut valve 79Rr is disposed. The master cut valve 79Fr and the master cut valve 79Rr are normally-open electromagnetic on-off valves which will be in a closed status only during energization of a solenoid. Circulation of the hydraulic fluid between the first pressure-increasing chamber 44 of the master cylinder 42 and the second actuator 210 is intercepted when the master cut valve 79Fr is in a closed status, and bidirectional circulation of the hydraulic fluid between the first pressure-increasing chamber 44 and the second actuator 210 is permitted when the master cut valve 79Fr is in an opened status. Similarly, circulation of the hydraulic fluid between the second pressure-increasing chamber 45 of the master cylinder 42 and the second actuator 210 is intercepted when the master cut valve 79Rr is in a closed status, and bidirectional circulation of the hydraulic fluid between the second pressure-increasing chamber 45 and the second actuator 210 is permitted when the master cut valve 79Rr is in an opened status.

Moreover, a simulator passage 25 branched from the upstream side of the master cut valve 79Fr is disposed in the main passage 21Fr. A stroke simulator 75 is connected to the simulator passage 25 through a simulator cut valve 76. The simulator cut valve 76 is a normally-closed electromagnetic on-off valve which will be in an opened status only during energization of a solenoid. Circulation of the hydraulic fluid between the main passage 21Fr and the stroke simulator 75 is intercepted when the simulator cut valve 76 is in a closed status, and bidirectional circulation of the hydraulic fluid between the main passage 21Fr and the stroke simulator 75 is permitted when the simulator cut valve 76 is in an opened status.

When the simulator cut valve 76 is in an opened status, the stroke simulator 75 introduces the hydraulic fluid of the quantity according to the amount of a brake operation into its interior to make a stroke operation of the brake pedal 30 possible, and generates opposing force according to the amount of a pedal operation to make brake operation feeling for a driver excellent.

A pressure-increasing linear control valve 77Fr is connected to the upstream side of the branch hydraulic pressure source passage 23Fr, and a pressure-reducing linear control valve 78Fr is connected to the downstream side thereof. At a part of the branch hydraulic pressure source passage 23Fr, which is on the downstream side of the pressure-increasing linear control valve 77Fr and on the upstream side of the pressure-reducing linear control valve 78Fr, a pressure control passage 26Fr is disposed by branching therefrom. The other end of this pressure control passage 26Fr is connected to the downstream side of master cut valve 79Fr in the main passage 21Fr. Moreover, the downstream side of the pressure-reducing linear control valve 78Fr is connected to the return passage 24.

Similarly, a pressure-increasing linear control valve 77Rr is connected to the upstream side of the branch hydraulic pressure source passage 23Rr, and a pressure-reducing linear control valve 78Rr is connected to the downstream side thereof. At a part of the branch hydraulic pressure source passage 23Rr, which is on the downstream side of the pressure-increasing linear control valve 77Rr and on the upstream side of the pressure-reducing linear control valve 78Rr, a pressure control passage 26Rr is disposed by branching therefrom. The other end of this pressure control passage 26Rr is connected to the downstream side of master cut valve 79Rr in the main passage 21Rr. Moreover, the downstream side of the pressure-reducing linear control valve 78Rr is connected to the return passage 24. In addition, in the hydraulic brake system 20, the side of the master cylinder 42 is referred to as the upstream side, and the side of the wheel cylinder 52 or the master reservoir 43, and the side of a pressure control reservoir 88 are referred to as the downstream side.

Figure 13:
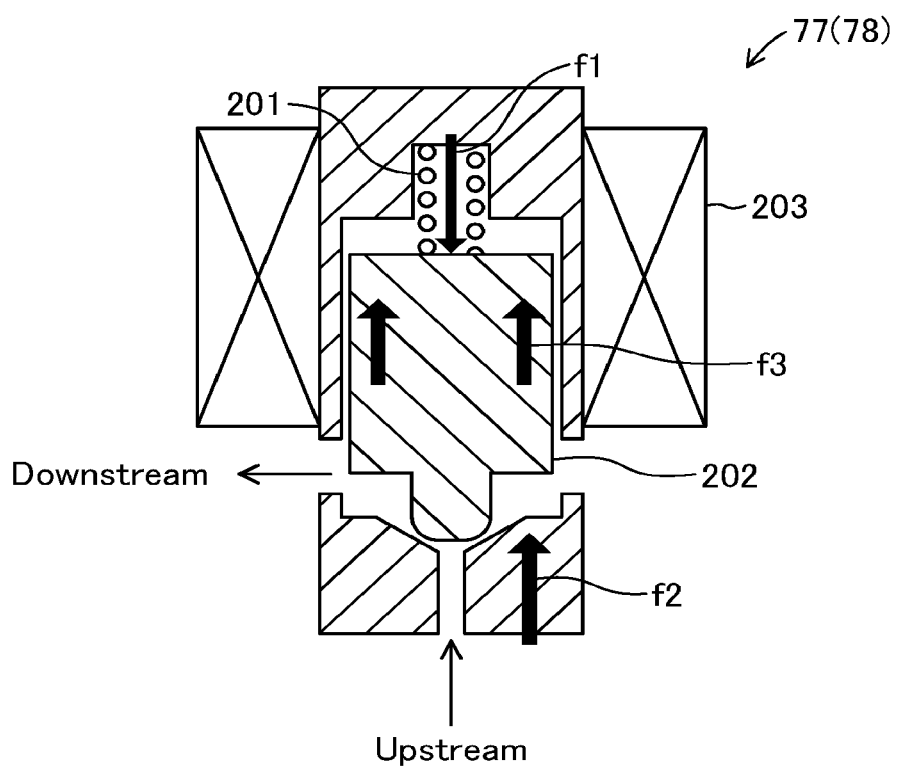
FIG. 13 is a diagram for explaining an operation principle of a linear control valve.

The pressure-increasing linear control valves 77Fr and 77Rr and pressure-reducing linear control valves 78Fr and 78Rr are normally-closed electromagnetic linear control valves. As shown in FIG. 13, the normally-closed electromagnetic linear control valves maintain a closed status by valve closing force (f1−f2) that is a difference between force f1 with which a spring 201 energizes a valve element (plunger) 202 in a closing direction and hydraulic pressure force f2 with which the valve element 202 is energized in an opening direction by pressure difference ΔP between the upstream side (inlet side) and the downstream side (outlet side), and open at a divergence according to the balance of forces which act on the valve element 202 when electromagnetic force f3 for opening the valve element 202 generated by the energization to a solenoid 203 exceeds this closing force. Therefore, by controlling the amount of energization (current value) to the solenoid 203, the divergence of the valve element 202 can be adjusted and the hydraulic pressure on the downstream side of the linear control valve can be changed continuously. Therefore, by performing the energization control of the pressure-increasing linear control valves 77 and pressure-reducing linear control valves 78, a status that the hydraulic fluid is permitted to flow from the power hydraulic pressure generator 70 into the pressure control passage 26, a status that the hydraulic fluid is permitted to flow out of the pressure control passage 26 to the master reservoir 43, and a status that the hydraulic fluid is permitted neither to flow from the power hydraulic pressure generator 70 into the pressure control passage 26 nor to flow out of the pressure control passage 26 to the master reservoir 43 can be switched to one another. Thereby, the hydraulic pressure in the pressure control passage 26 can be changed continuously.

Moreover, the first actuator 110 comprises an accumulator pressure sensor 121, a master pressure sensor 122, a control pressure sensor 123Fr, and a control pressure sensor 123Rr. The accumulator pressure sensor 121 outputs a detection signal showing the hydraulic pressure of the main hydraulic pressure source passage 22, i.e., the hydraulic pressure which the power hydraulic pressure generator 70 outputs. The master pressure sensor 122 outputs a detection signal showing the hydraulic pressure supplied from the first pressure-increasing chamber 44 of the master cylinder 42. The control pressure sensor 123Fr outputs a detection signal showing the hydraulic pressure in the pressure control passage 26Fr, i.e., the hydraulic pressure adjusted by the pressure-increasing linear control valve 77Fr and the pressure-reducing linear control valve 78Fr. The control pressure sensor 123Rr outputs a detection signal showing the hydraulic pressure in the pressure control passage 26Rr, i.e., the hydraulic pressure adjusted by the pressure-increasing linear control valve 77Rr and the pressure-reducing linear control valve 78Rr.

Next, the second actuator 210 will be explained. The second actuator 210 comprises a main passage 31Fr connected to the connection piping 65Fr, a main passage 31Rr connected to the connection piping 65Rr, an individual passage 32FR and an individual passage 32FL which are disposed by branching into two from the main passage 31Fr, and an individual passage 32RR and an individual passage 32RL which are disposed by branching into two from the main passage 31Rr. The individual passage 32FR is connected to the wheel cylinder 52FR through the individual piping 66FR, and the individual passage 32FL is connected to the wheel cylinder 52FL through the individual piping 66FL. The individual passage 32RR is connected to the wheel cylinder 52RR through the individual piping 66RR, and the individual passage 32RL is connected to the wheel cylinder 52RL through the individual piping 66RL.

In the middle of the main passage 31Fr, a main cut valve 81Fr is disposed. In the middle of the main passage 31Rr, a main cut valve 81Rr is disposed. The main cut valves 81Fr and 81Rr are normally-open electromagnetic valves which maintain an opened status while a solenoid is not being energized, and they are control valves which open at a divergence (pressure difference status) according to a differential pressure between the upstream side and downstream side of a valve element by energization to the solenoid. The main cut valves 81Fr and 81Rr not only can close the valve element, but also can control the differential pressure which is obtained by subtracting the downstream pressure from the upstream pressure, by controlling the amount of energization to the solenoid.

Moreover, a check valve 82 is disposed in parallel with the main cut valve 81Fr and the main cut valve 81Rr in the main passage 31Fr and the main passage 31Rr. Each check valve 82 bypasses the main cut valves 81 to permits a flow from the upstream side to the downstream side of the main cut valves 81, and intercepts a flow in the opposite direction. The individual passage 32FR, the individual passage 32FL, the individual passage 32RR and the individual passage 32RL are provided with a pressure-increasing valve 83FR, a pressure-increasing valve 83FL, a pressure-increasing valve 83RR and a pressure-increasing valve 83RL, respectively. Each pressure-increasing valve 83 is a normally-open electromagnetic on-off valve which will be in a closed status only during energization of a solenoid. Moreover, a check valve 84 is disposed in parallel with the pressure-increasing valve 83FR, the pressure-increasing valve 83FL, the pressure-increasing valve 83RR and the pressure-increasing valve 83RL in the individual passage 32FR, the individual passage 32FL, the individual passage 32RR and the individual passage 32RL. Each check valve 84 bypasses the pressure-increasing valve 83 to permit a flow from the downstream side to the upstream side of the pressure-increasing valve 83, and intercepts a flow in the opposite direction.

In the individual passage 32FR, the individual passage 32FL, the individual passage 32RR and the individual passage 32RL, an individual reservoir passage 33FR, an individual reservoir passage 33FL, an individual reservoir passage 33RR and an individual reservoir passage 33RL branch are disposed by branching from the downstream side of the pressure-increasing valve 83FR, the pressure-increasing valve 83FL, the pressure-increasing valve 83RR and the pressure-increasing valve 83RL. The individual reservoir passage 33FR, the individual reservoir passage 33FL, the individual reservoir passage 33RR and the individual reservoir passage 33RL are provided with a pressure-reducing valve 85FR, a pressure-reducing valve 85FL, a pressure-reducing valve 85RR and a pressure-reducing valve 85RL. Each pressure-reducing valve 85 is a normally-closed electromagnetic on-off valve which will be in an opened status only during energization of a solenoid. The individual reservoir passage 33FR and the individual reservoir passage 33FL are connected to the reservoir passage 34Fr. The individual reservoir passage 33RR and the individual reservoir passage 33RL are connected to the reservoir passage 34Rr.

The pressure control reservoir 88Fr is connected to the reservoir passage 34Fr. Moreover, the pressure control reservoir 88Rr is connected to the reservoir passage 34Rr. Therefore, when the pressure-reducing valves 85FR and 85FL are in an opened status, the hydraulic fluid of the wheel cylinders 52FR and 52FL can be returned to the pressure control reservoir 88Fr to depressurize the hydraulic pressure of the wheel cylinders 52FR and 52FL. Moreover, when the pressure-reducing valves 85RR and 85RL are in an opened status, the hydraulic fluid of the wheel cylinders 52RR and 52RL can be returned to the pressure control reservoir 88Rr to depressurize the hydraulic pressure of the wheel cylinders 52RR and 52RL.

One end of the pump passage 35Fr is connected to the reservoir passage 34Fr. The other end of the pump passage 35Fr is connected to the individual passages 32FR and 32FL. Similarly, one end of the pump passage 35Rr is connected to the reservoir passage 34Rr. The other end of the pump passage 35Rr is connected to the individual passages 32RR and 32RL. A pump 86Fr is disposed in the middle of the pump passage 35Fr, and a pump 86Rr is disposed in the middle of the pump passage 35Rr. The pump 86Fr pumps up the hydraulic fluid stored in the pressure control reservoir 88Fr and supplies it to the individual passages 32FR and 32FL. The pump 86Rr pumps up the hydraulic fluid stored in the pressure control reservoir 88Rr and supplies it to the individual passages 32RF and 32RL. A check valve 89 is disposed on the discharge side of each of the pumps 86Fr and 86Rr. Each check valve 89 is a valve which opens when the pressure difference between its upstream side (pump 86 side) and its downstream side is a predetermined pressure or more to permit a flow of the hydraulic fluid only in the discharge direction of the pump 86.

One end of a supply passage 36Fr is connected to a location which is on the upstream side rather than the main cut valves 81Fr in the main passage 31Fr. The other end of the supply passage 36Fr is connected to the pressure control reservoir 88Fr through a regulating valve 90Fr. Similarly, one end of a supply passage 36Rr is connected to a location which is on the upstream side rather than the main cut valves 81Rr in the main passage 31Rr. The other end of the supply passage 36Rr is connected to the pressure control reservoir 88Rr through a regulating valve 90Rr. Each regulating valve 90 is disposed in the upper part of the pressure control reservoir 88, and switches between an opened status and a closed status by a valve element moving according to the location of a piston disposed in the interior of the pressure control reservoir 88. This piston strokes according to the quantity of the hydraulic fluid stored in the pressure control reservoir 88. Therefore, the regulating valve 90 are opened only when the amount of the hydraulic fluid in the pressure control reservoir 88 is below a set amount, and a flow of the hydraulic fluid from the first actuator 110 to the pressure control reservoir 88 is permitted. Thereby, a flow of the hydraulic fluid from the first actuator 110 to the pressure control reservoir 88 is permitted when the hydraulic fluid needs to be supplied to the pressure control reservoir 88, and a flow of the hydraulic fluid from the first actuator 110 to the pressure control reservoir 88 is prevented when the hydraulic fluid does not need to be supplied to the pressure control reservoir 88.

The second actuator 210 comprises an upstream pressure sensor 125. The upstream pressure sensor 125 outputs a detection signal showing the hydraulic pressure in the main passage 31Fr.

Next, the first ECU120 disposed in the first hydraulic pressure control unit 100 and the second ECU220 which are disposed in the second hydraulic pressure control unit 200 will be explained. The first ECU120 controls an operation of the first actuator 110, and does not control an operation of the second actuator 210. On the other hand, the second ECU220 controls an operation of the second actuator 210, and does not control an operation of the first actuator 110. Although the first ECU120 and the first actuator 110 are assembled as one unit in the present embodiment, they may be disposed individually, and the first ECU120 and the first actuator 110 may be configured as a group (any group with a master-servant relationship in their control). Moreover, also as for the second ECU220 and the second actuator 210, although they are assembled as one unit in the present embodiment, they may be disposed individually, and second the ECU220 and the second actuator 210 may be configured as a group (any group with a master-servant relationship in their control).

The first ECU120 comprises a microcomputer as its principal part and has a motor drive circuit, an input/output interface to which various sensor signals are inputted, a drive circuit, a communication interface, etc. All the electromagnetic valves disposed in the first actuator 110 are connected to the first ECU120, and its opening-and-closing status and a divergence are controlled by a solenoid drive signal outputted from the first ECU120. Moreover, the motor 73 disposed in the power hydraulic pressure generator 70 is also connected to first ECU120 and a drive control thereof is carried out by a motor-drive signal outputted from the first ECU120.

Moreover, the first ECU120 is inputted detection signals outputted from the accumulator pressure sensor 121, the master pressure sensor 122, the control pressure sensors 123Fr and 123Rr which are sensors disposed in the first actuator 110, and detects an accumulator pressure Pacc, a master pressure Pmas, a control pressure PFr and a control pressure PRr. Moreover, a stroke sensor 124 disposed in the brake pedal 30 is connected to the first ECU120. The stroke sensor 124 detects a pedal stroke showing the amount of stepping-on (operation amount) of the brake pedal 30, and outputs a signal showing the detected pedal stroke Sp to the first ECU120.

Moreover, the first ECU120 comprises the communication interface, and has a function to be connected to a CAN (Controller Area Network) communication line 300 of a CAN communication system disposed in a vehicle through this communication interface and deliver and receive various kinds of vehicle information. An ECU for a vehicle control including the second ECU220 and the hybrid ECU8 is connected to this CAN communication line 300.

The first ECU120 stops the energization to a solenoid of each electromagnetic valve in a status that any brake pedal operation is not performed. For this reason, the master cut valves 79Fr and 79Rr are made into an opened status, and the pressure-increasing linear control valves 77Fr and 77Rr, the pressure-reducing linear control valves 78Fr and 78Rr, and the simulator cut valve 76 are made into a closed status. Moreover, in a status that a brake pedal operation is performed, the first ECU120 makes the master cut valves 79Fr and 79Rr into a closed status, and makes the simulator cut valve 76 into an opened status. And, as will be mentioned later, the first ECU120 sets up a front wheel target hydraulic pressure PRr* and a rear wheel target hydraulic pressure PRr*, and controls the energization of the pressure-increasing linear control valve 77Fr and the pressure-reducing linear control valve 78Fr so that the control pressure PFr detected by the control pressure sensor 123Fr becomes equal to the front wheel target hydraulic pressure PFr*. Moreover, the first ECU120 controls the energization of the pressure-increasing linear control valve 77Rr and the pressure-reducing linear control valve 78Rr so that the control pressure PRr detected by the control pressure sensor 123Rr becomes equal to the rear wheel target hydraulic pressure PRr*.

The second ECU220 comprises a microcomputer as its principal part and has a motor drive circuit, an input/output interface to which various sensor signals are inputted, a drive circuit, a communication interface, etc. All the electromagnetic valves disposed in the second actuator 210 are connected to the second ECU220, and its opening-and-closing status and a divergence are controlled by a solenoid drive signal outputted from the second ECU220. Moreover, the motor 87 which controls the pump 86 is also connected to the second ECU220 and a drive control thereof is carried out by a motor-drive signal outputted from the second ECU220.

Moreover, the second ECU220 is inputted a detection signal outputted from the upstream pressure sensor 125, and detects an upstream pressure P2. A wheel-speed sensor 126, a yaw rate sensor 127, and an acceleration sensor 128 are connected to the second ECU220. The wheel-speed sensor 126 is disposed for each of the wheels WFL, WFR, WRL and WRR, and outputs a pulse signal according to a wheel speed which is a rotational speed of each wheel WFL, WFR, WRL and WRR to the second ECU220. The yaw rate sensor 127 outputs a signal showing a yaw rate of a vehicle to the second ECU220. The acceleration sensor 128 outputs a signal showing acceleration (including deceleration) of the vehicle in a horizontal direction to the second ECU220. The second ECU220 calculates the wheel speed of the wheel W based on the pulse signal which each wheel-speed sensor 126 outputs, and further calculates a vehicle speed (vehicle body speed) based on the four wheel speeds.

The second ECU220 is connected to the CAN communications system through the CAN communication line 300, and is configured so that it can mutually deliver to and receive from the first ECU120, vehicle information, including a vehicle speed, a yaw rate of a vehicle, an acceleration of the vehicle, an existence of a braking demand, failure information and an implementation situation of various controls, etc.

The first ECU120 performs a regeneration coordination brake control which makes the wheel W generate friction braking force in coordination with regenerative braking force generated in the hybrid system 10. This regeneration coordination brake control is a usual brake control carried out when a driver steps on the brake pedal 30. On the other hand, the second ECU220 performs a brake control which operates the second actuator 210 to independently increase and decrease the hydraulic pressure of each of the four wheel cylinder 52 and adjusts the same, only when a necessity arises according to a status of a vehicle. This brake control is referred to as an additional brake control. The second ECU220 performs, as this additional brake control, an antilock control (referred to as ABS) which suppresses a lock of the wheel at the time of braking and secures the stability of the vehicle, a traction control (referred to as TRC) which suppresses a slip of a driving wheel at the time of an acceleration and secures the stability of the vehicle, and a vehicle stability control (referred to as VSC) which suppresses a side skid of the vehicle and secures the stability of the vehicle, etc. The second ECU220 stops the energization to the second actuator 210 when it does not perform the additional brake control or the backup control. In this case, the opening-and-closing status of each electromagnetic valve comes to be shown in FIG. 2, and the hydraulic pressure outputted from the first actuator 110 is transmitted to the wheel cylinder 52 as it is.

Figure 3:
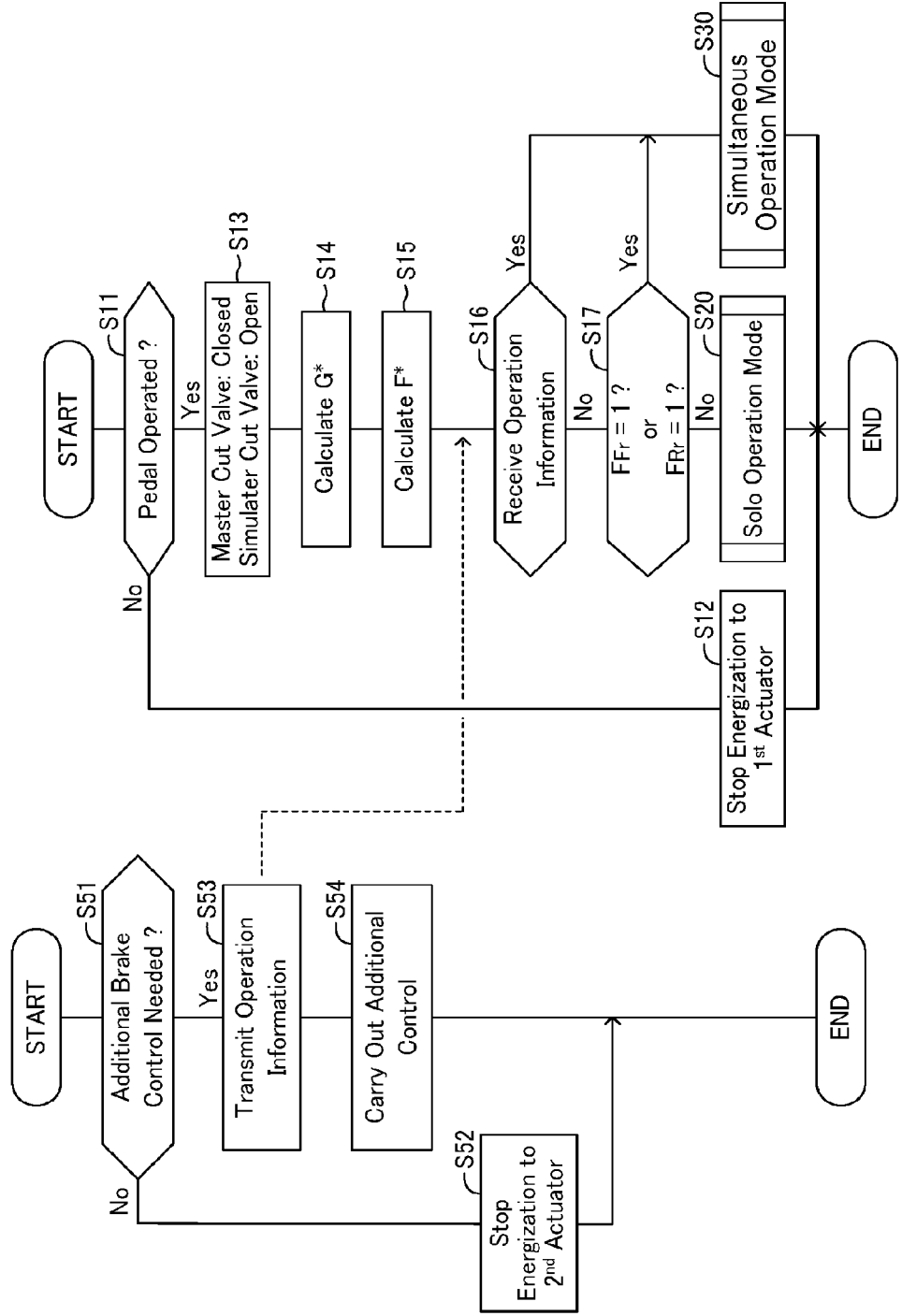
FIG. 3 is a flowchart for showing a brake control routine.

Hereafter, the brake control processing which the first ECU120 and the second ECU220 carry out will be explained using FIG. 3. The flowchart on the left side in FIG. 3 shows the brake control routine which the second ECU220 carries out, and the flowchart of the right side in FIG. 3 shows the brake control routine which the first ECU120 carries out. Each brake control routine is carried out repeatedly in a predetermined short period.

The first ECU120 judges whether a brake pedal operation is performed by a driver in step S11. For instance, the first ECU120 reads a pedal stroke Sp detected by the stroke sensor 124 and a master pressure Pmas detected by the master pressure sensor 122, and judges that the brake pedal operation is being performed when at least one of a fact that the pedal stroke Sp is larger than an operation judgment threshold value Spref and a fact that the master pressure Pmas is larger than an operation judgment threshold value Pmasref is detected.

In step S11, when judged that the brake pedal operation is not being performed, the first ECU120 moves the treatment to step S12, changes it into a status that the energization to the first actuator 110 is stopped, and once ends this routine. Therefore, the master cut valve 79Fr and 79Rr which are normally-open electromagnetic valves formed in the first actuator 110 are made into an opened status, and the pressure-increasing linear control valves 77Fr and 77Rr, the pressure-reducing linear control valves 78Fr and 78Rr, and the simulator cut valve 76 which are normally-closed electromagnetic valves are made into a closed status. Thereby, the main passages 21Fr and 21Rr are opened up, and it becomes a status that the hydraulic pressure in the first pressure-increasing chamber 44 and the second pressure-increasing chamber 45 of the master cylinder 42 is transmitted to the second actuator 210 as it is. The first ECU120 repeats such a treatment until a brake pedal operation is detected. In addition, regardless of the existence of a brake pedal operation, the first ECU120 controls the operation of the motor 73 so that the accumulator pressure Pacc falls within a set pressure range.

When a brake pedal operation is detected in step S11, the first ECU120 makes the master cut valves 79Fr and 79Rr into a closed status, and makes the simulator cut valve 76 into an opened status in step S13. Then, in step S14, the first ECU120 calculates target deceleration G* of a vehicle body based on the pedal stroke Sp detected by the stroke sensor 124 and the master pressure Pmas detected by the master pressure sensor 122. The larger the pedal stroke Sp is and the larger the master pressure Pmas is, the larger value the target deceleration G* is set to. The first ECU120 memorizes a map which represents a correspondence relation between the pedal stroke Sp and the target deceleration GS* and a map which represents a correspondence relation between the master pressure Pmas and the target deceleration Gp*, for example. The first ECU120 calculates the target deceleration GS* of a vehicle body by adding a value obtained by the multiplication of target deceleration GS* computed from the pedal stroke Sp by a weighting coefficient k (0<k<1) to a value obtained by the multiplication of target deceleration Gp* computed from the master pressure Pmas by a weighting coefficient (1−k) (G*=k×GS*+(1−k)×Gp*). This weighting coefficient k is set up so as to be a small value in a range where the pedal stroke Sp is large.

Then, the first ECU120 calculates the target total braking force F* of a wheel set up corresponding to the target deceleration G* in step S15. Then, the first ECU120 judges whether the operation information of an additional brake control is received in step S16. As will be mentioned later, the second ECU220 transmits the operation information which shows the operating situation to the CAN communication line 300, during implementation of the additional brake control. Therefore, the first ECU120 judges the existence of the operation information transmitted to the CAN communication line 300 in this step S16. In this case, the existence of the operation information of the additional brake control when a brake pedal operation is being performed will be judged. This operation information includes information showing type of the additional brake control and the braking system (a front wheel braking system, a rear wheel braking system) which was operated.

When the operation information is not transmitted (S16: No), the first ECU120 reads a front wheel start estimation flag FFr and a rear wheel start estimation flag FRr, and judges whether at least one of the flags is "1" in subsequent step S17. The front wheel start estimation flag FFr and the rear wheel start estimation flag FRr are set up by the second actuator operation start estimation routine which will be mentioned later, and both of them are set to "0" when estimated that the second actuator 210 is not operating. Moreover, the front wheel start estimation flag FFr is set to "1" when estimated that the front wheel braking system of the second actuator 210 is operating, and the rear wheel start estimation flag FRr is set to "1" when estimated that the rear wheel braking system is operating.

When the first ECU120 judged with "No" in step S17, that is, in a situation where the operation information of the second actuator 210 has not been received and it is not estimated that the operation of the second actuator 210 has been started, the first ECU120 carries out a brake control set as a solo operation mode in step S20. On the other hand, when judged with "Yes" in step S16 or step S17, that is, in a situation where the operation information of the second actuator 210 is received or it is estimated that the operation of the second actuator 210 has been started, the first ECU120 carries out a brake control set as a simultaneous operation mode in step S30.

<Additional Brake Control>

Here, before explaining a brake control in the solo operation mode and simultaneous operation mode, an additional brake control treatment performed in the second hydraulic pressure control unit 200 will be explained. The second ECU220 carries out the brake control routine on the left side of FIG. 3. The second ECU220 judges whether it is necessary to carry out an additional brake control in step S51. That is, it judges whether an ABS execution condition, a TRC execution condition, and a VSC execution condition are satisfied. When the execution conditions for an additional brake control are not satisfied (S51: No), the second ECU220 stops the energization to the second actuator 210 in step S52. Therefore, the main cut valves 81Fr and 81Rr, the pressure-increasing valve 83FR, the pressure-increasing valve 83FL, the pressure-increasing valve 83RR, and the pressure-increasing valve 83RL are maintained in an opened status, and the pressure-reducing valve 85FR, the pressure-reducing valve 85FL, the pressure-reducing valve 85RR, and the pressure-reducing valve 85RL are maintained in a closed status. Moreover, the motor 87 is also maintained in a halt condition. For this reason, the hydraulic pressure supplied from the first actuator 110 to the second actuator 210 through the connection piping 65Fr is supplied to the wheel cylinders 52FR and 52FL of front wheels as it is, and the hydraulic pressure supplied from the first actuator 110 to the second actuator 210 through the connection piping 65Rr is supplied to wheel cylinders 52RR and 52RL of rear wheels as it is.

The second ECU220 repeats such a treatment in a predetermined period. And, when the execution conditions for an additional brake control are satisfied (S51: Yes), the operation information of an additional brake control is transmitted to the first ECU120 through the CAN communication line 300 in step S53.

Then, the second ECU220 carries out an additional brake control in step S54. Hereafter, an additional brake control will be explained. In addition, since various techniques are known about an additional brake control, any technique can be employed.

<Antilock Control: ABS>

For example, the second ECU220 calculates the slip ratio of each wheel by comparing each wheel speed of the four wheels with the vehicle speed (vehicle body speed), and judges that a wheel is locked when the slip ratio of any one of the wheels exceeds an ABS start judgment threshold value, and starts an ABS control. In this case, the second ECU220 closes the pressure-increasing valve 83 of a target wheel for ABS control to maintain the hydraulic pressure of the wheel cylinder 52 at first, and then temporarily closes the pressure-reducing valve 85 to reduce the hydraulic pressure of the wheel cylinder 52. Thereafter, it controls the opening and closing of the pressure-increasing valve 83 to raise the hydraulic pressure of the wheel cylinder 52 to a supply pressure (hydraulic pressure supplied from the first actuator 110). When ABS is carried out, the second ECU220 makes the hydraulic pressure of the wheel cylinder 52 change with a predetermined gradient by controlling the energization of the pressure-increasing valve 83 and the energization of the pressure-reducing valve 85, based on the upstream pressure P2 detected by the upstream pressure sensor 125.

<Vehicle Stability Attitude Control: VSC>

Moreover, the second ECU220 judges that a vehicle is in a side-skid tendency and starts VSC, for instance, when the deviation between an actual yaw rate and a computational yaw rate supposed to occur exceeds a VSC start judgment threshold value, based on a yaw rate, a wheel speed and the vehicle information (such as steering angle) transmitted to the CAN communication line 300. In this case, the second ECU220 closes the main cut valves 81Fr and 81Rr and closes the pressure-increasing valve 83 of a wheel not to be controlled, when a VSC execution condition is satisfied in a status that a brake pedal operation is performed by a driver. Moreover, the second ECU220 drives the motor 87 to operate the pump 86, and opens and closes the pressure-increasing valve 83 of a wheel to be controlled. Thereby, the difference of braking force between the wheels is generated and a side skid of the vehicle is prevented. On the other hand, when the VSC execution condition is satisfied in a status that any brake pedal operation is not performed by a driver, the main cut valves 81Fr and the 81Rr are closed, and the motor 87 is driven to operate the pump 86. Thereby, the hydraulic pressure pressurized by the pump 86 is supplied to the wheel cylinders 52 of the four wheels through the pressure-increasing valve 83, and a side skid of the vehicle is prevented.

<Traction Control: TRC>

Moreover, the second ECU220 judges that a driving wheel is slipping and starts TRC when the difference between the wheel speed of a driving wheel and the wheel speed of a coupled driving wheel (driven wheel) exceeds a TRC start judgment threshold value. In this case, the second ECU220 performs the same control as VSC at the time of not braking.

Thus, the second ECU220 carries out an additional brake control independently of the regeneration coordination braking control which first ECU120 carries out. The second ECU220 will once end this routine, when an additional brake control is started in step S54. And, such a treatment is repeated until an additional brake control is completed. The second ECU220 stops the energization to the second actuator 210 in step S52, after the additional brake control is completed.

<Solo Operation Mode>

Figure 4:
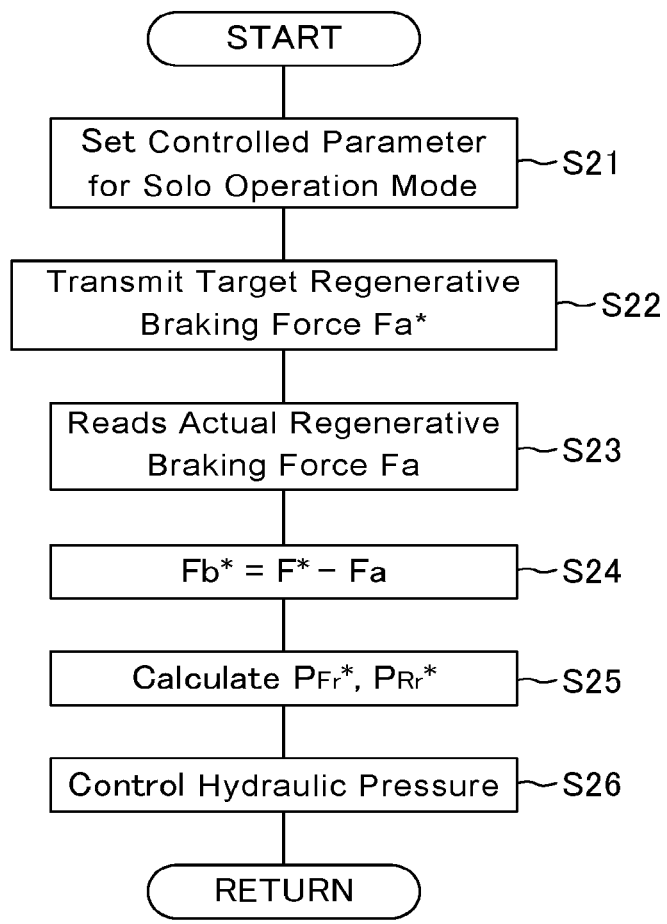
FIG. 4 is a flowchart for showing a solo operation mode control routine.

Now return to the explanation of the brake control which the first ECU120 carries out. FIG. 4 shows a solo operation mode control routine which is a treatment in step S20. The first ECU120 has memorized the controlled parameter for a solo operation mode and a controlled parameter for a simultaneous operation mode. And, when a solo operation mode is set up, the first ECU120 will choose the controlled parameter for a solo operation mode in step S21. The controlled parameter for a solo operation mode has been set up on the assumption that the second actuator 210 is not operating, and the controlled parameter for a simultaneous operation modes is set up on the assumption that the second actuator 210 is operating. For instance, controlled parameters selectively set up in the present embodiment are controlled parameters about a hydraulic pressure control, such as control threshold values of the pressure-increasing linear control valves 77Fr and 77Rr and pressure-reducing linear control valves 78Fr and 78Rr, and a cut-off frequency of a low-pass filter of the control pressures PFr and PRr detected by the control pressure sensors 123Fr and 123Rr, etc. When the second actuator 210 is not operating, the hydraulic pressure which the first actuator 110 outputs is supplied to each wheel cylinder 52 as it is. Therefore, when the controlled parameter optimally set up on the assumption that the second actuator 210 is not operating is applied to a situation where the second actuator 210 is operating, the hunching of the control of the pressure-increasing linear control valve 77 and the pressure-reducing linear control valve 78 is likely to occur due to the influence of the operation of the second actuator 210. Then, in the present embodiment, the controlled parameter for a solo operation mode and the controlled parameter for a simultaneous operation mode can be selectively used.

Figure 6:
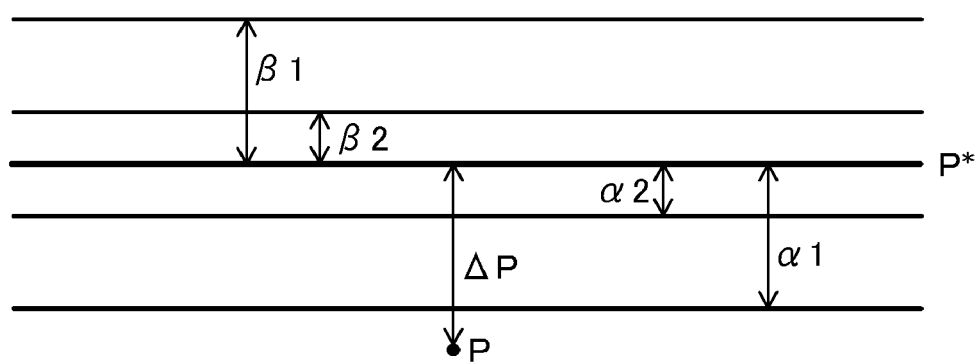
FIG. 6 is a diagram for showing a control threshold value.

For instance, in the energization control of the pressure-increasing linear control valve 77 and the pressure-reducing linear control valve 78, as shown in FIG. 6, a pressure-increasing start threshold value $\alpha 1$, a pressure-increasing stop threshold value $\alpha 2$, a pressure-reducing start threshold value 131 and a pressure-reducing stop threshold value P2 for setting up a dead band of a hydraulic pressure control are set up. The first ECU120 opens the pressure-increasing linear control valve 77 to increase the pressure when the deviation $\Delta P$ (=P*−P) between the target hydraulic pressure P* and the detection hydraulic pressure P (=control pressure PFr, control pressure PRr) becomes larger than the pressure-increasing start threshold value $\alpha 1$, and closes the pressure-increasing linear control valve 77 to change the situation into a hydraulic pressure holding status when the deviation $\Delta P$ becomes less than the pressure-increasing stop threshold value $\alpha 2$. Moreover, the first ECU120 opens the pressure-reducing linear control valve 78 to decrease the pressure when the deviation $\Delta P$ in a negative direction between the target hydraulic pressure P* and the detection hydraulic pressure P becomes larger than the pressure-reducing start threshold value $\beta 1$, and closes the pressure-reducing linear control valve 78 to change the situation into a hydraulic pressure holding status when the deviation $\Delta P$ in the negative direction becomes less than the pressure-reducing stop threshold value $\beta 2$. The hunching of the control is prevented by thus preparing a dead band. The pressure-increasing start threshold value $\alpha 1$, pressure-increasing stop threshold value $\alpha 2$, pressure-reducing start threshold value $\beta 1$ and pressure-reducing stop threshold value $\beta 2$ are set up larger for a simultaneous operation mode as compared with those for a solo operation mode. That is, in a simultaneous operation mod, a broader dead band is set up as compared with that in a solo operation mode.

Moreover, although the control pressures PFr and PRr detected by control pressure sensors 123Fr and 123Rr are filtered with a low-pass-filter in order to remove high frequency components, the cut-off frequency of the low-pass filter in the present embodiment is set lower in a simultaneous operation mode as compared with that in a solo operation mode. That is, a fluctuation of the control pressures PFr and PRr can be suppressed more successfully to prevent the hunching of the control in a simultaneous operation mode as compared with those in a solo operation mode.

In subsequent step S22, the first ECU120 calculates target regenerative braking force Fa*, and transmits a regenerative braking demand and the target regenerative braking force Fa* to the hybrid ECU8 through the CAN communication line 300. Based on vehicle speed information transmitted from the second ECU220, the first ECU120 calculates maximum regenerative braking force corresponding to the vehicle speed, and sets the target regenerative braking force Fa* to the value which is smaller one of the target total braking force F* and the maximum regenerative braking force. Therefore, the target regenerative braking force Fa* will be set to the value of target total braking force F* as it is when the target total braking force F* is smaller than the maximum regenerative braking force, and the target regenerative braking force Fa* will be set to the value of the maximum regenerative braking force when the target total braking force F* is larger than the maximum regenerative braking force. In addition, the maximum regenerative braking force may be calculated in consideration of not only the speed information, but also the state of charge of a battery, this information is periodically provided from the hybrid ECU8, etc.

The hybrid ECU8 is always repeatedly judging whether the regenerative braking demand has been transmitted from the first ECU120 in a predetermined period, and operates the motor 2 as a dynamo so that the regenerative braking force as close to the target regenerative braking force Fa* as possible is generated with the target regenerative braking force Fa* as an upper limit when the regenerative braking demand is received. The electric power generated by the motor 2 is collected in the battery 1 through the inverter 6. The hybrid ECU8 calculates an actual regenerative braking force actually generated by the motor 2 (referred to as an actual regenerative braking force Fa) based on the power generation current and power generation voltage of the motor 2, and transmits information which shows the actual regenerative braking force Fa through the CAN communication line 300 to the first ECU120.

In subsequent step S23 continuing, the first ECU120 reads the actual regenerative braking force Fa, and calculates target friction braking force Fb* (=F*−Fa) by subtracting the actual regenerative braking force Fa from the target total braking force F* in subsequent step S24. Then, in step S25, the first ECU120 distributes this target friction braking force Fb* to the front wheel system braking force FbFr* and the rear wheel system braking force FbRr* at a predetermined distribution ratio, and calculates the front wheel target hydraulic pressure PFr* set up according to the front wheel system braking force FbFr* (front wheel target hydraulic pressure PFr* which can generate the front wheel system braking force FbFr*) and the rear wheel target hydraulic pressure PRr* set up according to the rear wheel system braking force FbRr* (rear wheel target hydraulic pressure PRr* which can generate the rear wheel system braking force FbRr*).

Then, in step S26, the first ECU120 controls the current flowing through each solenoid of the pressure-increasing linear control valve 77Fr and the pressure-reducing linear control valve 78Fr, by the feedback control of hydraulic pressure, so that the control pressure PFr detected by the control pressure sensor 123Fr becomes equal to the front wheel target hydraulic pressure PFr*. Moreover, the first ECU120 controls the current flowing through each solenoid of the pressure-increasing linear control valve 77Rr and the pressure-reducing linear control valve 78Rr, by the feedback control of hydraulic pressure, so that the control pressure PRr detected by the control pressure sensor 123Rr becomes equal to the rear wheel target hydraulic pressure PRr*.

When controlling the energization to the pressure-increasing linear control valve 77 and the pressure-reducing linear control valve 78, the first ECU120 refers to a valve-opening current characteristic to obtain a valve-opening current iopen corresponding to pressure difference ΔP between an upstream side hydraulic pressure and a downstream side hydraulic pressure of the linear control valve, and sets up a target current i* which is energized to the linear control valve on the basis of this valve-opening current iopen. For instance, the target current i* is calculated by adding a value obtained by the multiplication of the deviation ΔP between the target hydraulic pressure PFr* (PRr*) and the control pressure PFr (PRr) by a feedback gain Gfb to the valve-opening current iopen (i*=iopen+Gfb×ΔP). In this case, the dead band set up with the pressure-increasing start threshold value α1, pressure-increasing stop threshold value α2, pressure-reducing start threshold value β1 and pressure-reducing stop threshold value β2 is taken into consideration.

By such an energization control to the pressure-increasing linear control valve 77 and the pressure-reducing linear control valve 78, from the first actuator 110, the hydraulic pressure controlled to follow the front wheel target hydraulic pressure PFr* is supplied to the main passage 31Fr of the second actuator 210 through the connection piping 65Fr, and the hydraulic pressure controlled to follow the rear wheel target hydraulic pressure PRr* is supplied to the main passage 31Rr of the second actuator 210 through the connection piping 65Rr. In this case, since the operation of the second actuator 210 was stopped, the hydraulic pressure controlled to follow the front wheel target hydraulic pressure PFr* is supplied to the wheel cylinders 52FR and 52FL of the front wheel system as it is, and the hydraulic pressure controlled to follow the rear wheel target hydraulic pressure PRr* is supplied to the wheel cylinders 52RL and 52RR as it is. Therefore, the braking force by the regeneration coordination brake control generates in the wheel W.

<Simultaneous Operation Mode>

Figure 5:
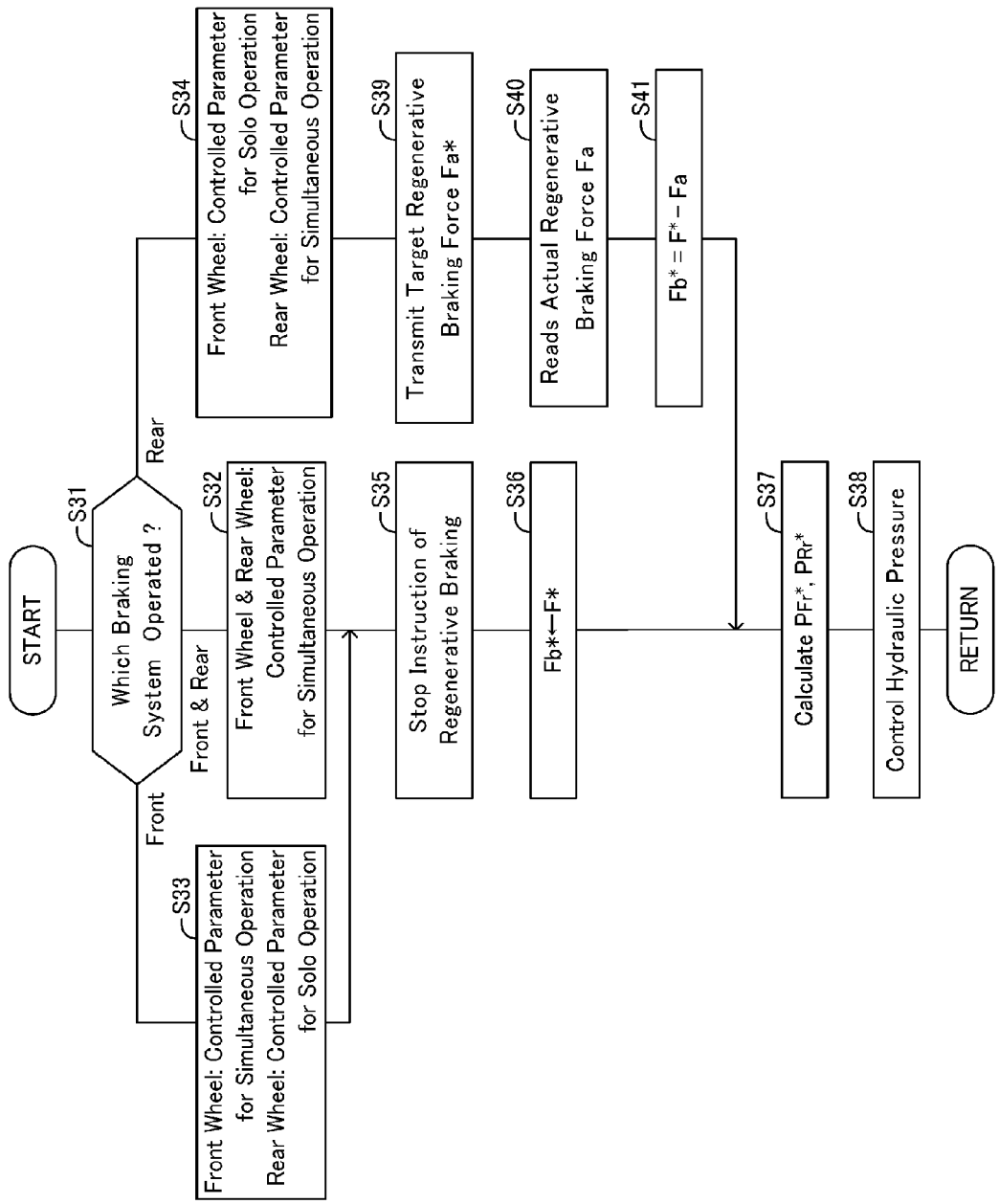
FIG. 5 is a flowchart for showing a simultaneous operation mode control routine.

FIG. 5 shows the simultaneous operation mode control routine which is a treatment in step S30 of the first ECU120. When the simultaneous operation mode is set up, the first ECU120 judges which braking system is operated by the second actuator 210 (including a case where the operation is estimated) in step S31, based on the operation information transmitted from the second ECU220 or the front wheel start estimation flag FFr and the rear wheel start estimation flag FRr. When both the front wheel braking system and the rear wheel braking system are operated, the first ECU120 moves the treatment to step S32, and sets the controlled parameter for the front wheel braking system and rear wheel braking system of the first actuator 110 to the controlled parameter for the simultaneous operation. Moreover, when the second actuator 210 is operated only in the front wheel braking system, the first ECU120 moves the treatment to step S33, sets the controlled parameter for the front wheel braking system of the first actuator 110 to the controlled parameter for the simultaneous operation, and sets the controlled parameter for the rear wheel braking system to the controlled parameter for the solo operation. Moreover, when the second actuator 210 is operated only in the rear wheel braking system, the first ECU120 moves the treatment step S34, sets the controlled parameter for the front wheel braking system of the first actuator 110 to the controlled parameter for the solo operation, and sets the controlled parameter for the rear wheel braking system to the controlled parameter for the simultaneous operation.

In the controlled parameter for the simultaneous operation, the pressure-increasing start threshold value α1, pressure-increasing stop threshold value α2, pressure-reducing start threshold value β1 and pressure-reducing stop threshold value β2 are set up larger, and the cut-off frequency of the low-pass filter of the control pressures PFr and PRr is set up lower, as compared with those in the controlled parameter for the solo operation. In addition, the controlled parameter for the front wheel braking system is the controlled parameter for the hydraulic pressure control by the pressure-increasing linear control valve 77Fr and the pressure-reducing linear control valve 78Fr, and the controlled parameter for the rear wheel braking system is the controlled parameter for the hydraulic pressure control by the pressure-increasing linear control valve 77Rr and the pressure-reducing linear control valve 78Rr.

When judged that the front wheel braking system of the second actuator 210 is operating (S32, S33), the first ECU120 transmits a stop instruction of the regenerative braking to the hybrid ECU8 through the CAN communication line 300 in step S35. The hybrid ECU8 will stop the regenerative braking when this stop instruction is received. In subsequent step S36, the first ECU120 sets up the value of the target total braking force F* computed in step S15 as the target friction braking force Fb* (Fb*←F*). That is, the target friction braking force Fb* is computed by setting the regenerative braking force to zero. Then, in step S37, the first ECU120 distributes this target friction braking force Fb* to the front wheel system braking force FbFr* and the rear wheel system braking force FbRr* at a predetermined distribution ratio, and calculates the front wheel target hydraulic pressure PFr* set up according to the front wheel system braking force FbFr* and the rear wheel target hydraulic pressure PRr* set up according to the rear wheel system braking force FbRr*. Therefore, in the simultaneous operation mode, from the point of time when the start of the operation (operation start) of the second actuator 210 is estimated, the target hydraulic pressures PFr* and PRr* are changed to become larger.

Then, in step S38, the first ECU120 controls the current flowing through each solenoid of the pressure-increasing linear control valve 77Fr and the pressure-reducing linear control valve 78Fr, by the feedback control of hydraulic pressure, so that the control pressure PFr detected by the control pressure sensor 123Fr becomes equal to the front wheel target hydraulic pressure PFr*. Moreover, the first ECU120 controls the current flowing through each solenoid of the pressure-increasing linear control valve 77Rr and the pressure-reducing linear control valve 78Rr, by the feedback control of hydraulic pressure, so that the control pressure PRr detected by the control pressure sensor 123Rr becomes equal to the rear wheel target hydraulic pressure PRr*.

Moreover, when judged that the second actuator 210 is operated only in the rear wheel braking system, the first ECU120 sets up the controlled parameter in step S34 as mentioned above. Then, in subsequent step S39, the first ECU120 calculates the target regenerative braking force Fa* and transmits the regenerative braking demand and target regenerative braking force Fa* to the hybrid ECU8 through the CAN communication line 300. The first ECU120 reads the actual regenerative braking force Fa in subsequent step S40, computes the target friction braking force Fb* (=F*−Fa) by subtracting the actual regenerative braking force Fa from the target total braking force F* in step S41, and moves the treatment to step S37. The treatment in step S39 to step S41 is the same as that in step S22 to step S24 in the above-mentioned solo operation mode. Since the vehicle according to the present embodiment is a front-wheel-drive vehicle and only front wheels generate regenerative braking force, the operation (ABS, VSC) of the second actuator 210 is not adversely affected by regenerative braking when the second actuator 210 is operated only in the rear wheel braking system. Therefore, the regenerative braking is not stopped in the present embodiment. However, the regenerative braking may be reduced (or stopped) instead.

Through the execution of this simultaneous operation mode control routine, the controlled parameter for the braking system of the first actuator 110 communicated to the braking system operating in the second actuator 210 is set to the controlled parameter on assumption that the second actuator 210 is operating. Moreover, since a stop instruction of regenerative braking is transmitted at the point of time when the start of the operation of the front wheel braking system of the second actuator 210 is estimated, without waiting for the operation information of the second actuator 210, regenerative braking can be stopped early. Furthermore, since the target friction braking force Fb* is set up using the target total braking force F* (Fb*←F*), the target hydraulic pressure can be increased early. Therefore, switching between the pressure-increasing operation of the pressure-increasing linear control valve 77 and the pressure-reducing operation of the pressure-reducing linear control valve 78 in a short period is suppressed can be suppressed, and stable hydraulic pressure can be supplied from the first actuator 110 to the second actuator 210. Moreover, since regenerative braking is stopped when the front wheel braking system of the second actuator 210 is operating, the operation (ABS, VSC) of the second actuator can be carried out properly.

<Operation Start Estimation of Second Actuator>

In the present embodiment, although the second ECU220 transmits the operation information of the additional brake control to the first ECU120 and switches the control mode of the regeneration coordination brake based on this operation information, a time delay occurs in transmission of the operation information since the operation information is transmitted to the first ECU120 through the CAN communication line 300. Then, the first ECU120 has a function for estimating whether the second actuator 210 has been operated, that is, whether the second ECU220 has started the additional brake control. And, the first ECU120 switches the control mode to the simultaneous operation mode from the solo operation mode, without waiting for the reception of the operation information, when estimated that the additional brake control has been started, during the execution of the regeneration coordination brake control.

Here, the principle of the estimation of an implementation start of the additional brake control (operation start of the second actuator) will be explained. In the present embodiment, although it is configured so that the start of the ABS control at least can be estimated, also in a case where the VSC is started, it is estimated that the second actuator 210 has been operated when a judgment condition which will be mentioned later is satisfied.

The ABS control is carried out by the opening-and-closing control of the pressure-increasing valve 83 and the pressure-reducing valve 85. Since the pressure-increasing valve 83 is closed by energization and holds the hydraulic pressure of the wheel cylinder 52, the pressure increasing valve 83 is referred to as the holding valve 83 hereafter. The holding valve 83 is maintained in an opened status in a usual brake control, and closed at the time of the start of the ABS control. Although the linear control valves 77 and 78 of the first actuator 110 are in communication with the wheel cylinder 52 in a status that the holding valve 83 is opened, the passage of the hydraulic fluid between the linear control valves 77 and 78 of the first actuator 110 and the wheel cylinder 52 is intercepted by the holding valve 83 in a status that the holding valve 83 is closed. Therefore, the hydraulic pressure rigidity of the supply passage to which the hydraulic fluid is supplied from the linear control valves 77 and 78 changes depending on the opening-and-closing statuses of the holding valve 83. For instance, between the status that the holding valve 83 is opened and the status that the holding valve 83 is closed, the increased amount of the hydraulic pressure is different, even when the pressure-increasing linear control valve 77 sends out the hydraulic fluid at the same flow rate. Similarly, between the status that the holding valve 83 is opened and the status that the holding valve 83 is closed, the decreased amount of the hydraulic pressure is different, even when the pressure-reducing linear control valve 78 discharges the hydraulic fluid to the return passage 24 at the same flow rate. That is, the variation of the hydraulic pressure with respect to the flow rate of hydraulic fluid is larger in the case where the holding valve 83 is closed, as compared with the case where the holding valve 83 is opened. The operation of the ABS can be estimated using this. Moreover, the operation of the VSC can be estimated by the same principle.

Figure 7:
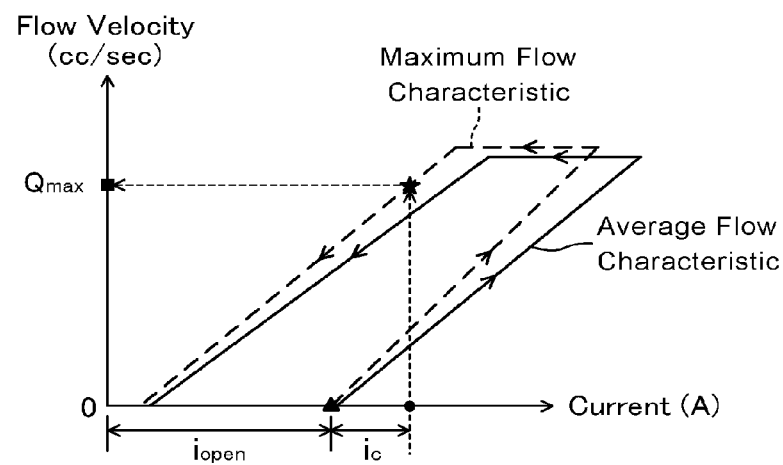
FIG. 7 is a graph for showing a flow characteristic.

FIG. 7 shows a flow characteristic of a normally-closed electromagnetic linear control valve. The horizontal axis represents a current applied to the linear control valve, and the vertical axis represents flow velocity (flow rate per unit time). In a linear control valve, a constant relation exists between the valve-opening current iopen and the pressure difference $\Delta P$ which is a differential pressure between the upstream side hydraulic pressure (inlet side hydraulic pressure) and the downstream side hydraulic pressure (outlet side hydraulic pressure). In the case of a normally-closed electromagnetic linear control valve, the valve-opening current iopen represents a current value when a valve element starts opening the valve in the course of increasing a current flowing through a solenoid from a closed status. When the current for energization of a linear control valve exceeds the valve-opening current iopen, the hydraulic fluid flows at a flow velocity proportional to the excessive current ic. A linear control valve has hysteresis characteristics. When reducing the current from an opened status, after maintaining the divergence, the flow velocity falls along with a reduction of the current. Such a characteristic has variation depending on a temperature and individual specificity of a linear control valve, etc. The characteristic represented by a solid line in the drawing shows the characteristic of an average linear control valve among the variations, and the characteristic represented by a dashed line shows the characteristic presenting a maximum flow velocity with respect to the current (referred to as a maximum flow characteristic) among the variations.

The flow characteristic of FIG. 7 is a characteristic in a status that the holding valve 83 is opened, i.e., a status that the linear control valves 77 and 78 are in communication with the wheel cylinder 52. Therefore, in the status that the holding valve 83 is being opened, when the values of the currents flowing through the linear control valves 77 and 78 are found, the maximum values which the flow rates of the hydraulic fluid sent out from the linear control valves 77 and 78 may be (referred to as the maximum flow rate Qmax) will be found. That is, it is thought that the flow rates of the hydraulic fluid sent out from the linear control valves 77 and 78 do not exceed the maximum flow rate Qmax even when the variation in characteristic, etc. is taken into consideration, in the status that the holding valve 83 is being opened. Hereafter, the pressure-increasing linear control valve 77 will be explained as an example.

Figure 8:
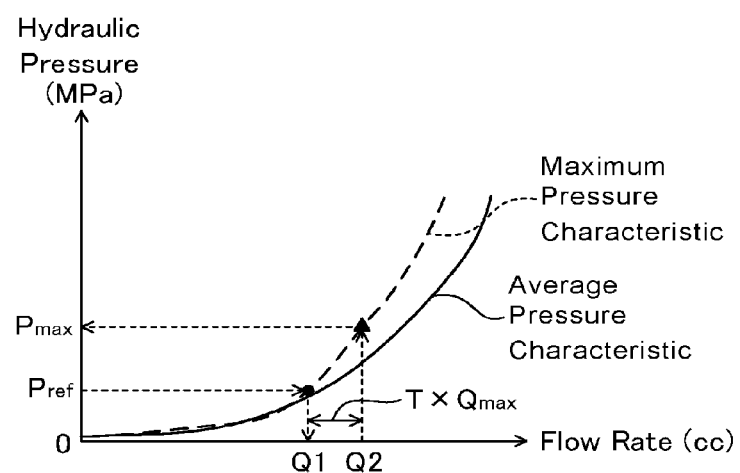
FIG. 8 is a graph for showing a pressure characteristic.

FIG. 8 shows the flow-rate-pressure characteristic which shows the relation between the flow rate of hydraulic fluid supplied to the wheel cylinder 52 and the wheel cylinder pressure. Also in this characteristic, there is variation depending on a temperature and the individual specificity of the wheel cylinder 52, etc. In FIG. 8, a solid line shows an average flow-rate-pressure characteristic among the variation, and a dashed line shows a flow-rate-pressure characteristic presenting maximum pressure with respect to the flow rate among the variation (referred to as the maximum pressure characteristic). For instance, wheel cylinder pressure is detected in a predetermined sampling period, and the wheel cylinder pressure detected at the time of the last sampling is defined as the reference hydraulic pressure Pref. The flow rate Q1 of the hydraulic fluid supplied to the wheel cylinder can be computed from this reference hydraulic pressure Pref, using the maximum characteristic of FIG. 8. And, the hydraulic pressure corresponding to flow rate Q2 can be drawn by calculating a flow rate Q2 (=Q1+T×Qmax) obtained by adding the multiplication value (T×Qmax) of a sampling period T and the maximum flow rate Qmax to this flow rate Q1 and referring to the maximum pressure characteristic. This hydraulic pressure corresponds to the maximum value which the hydraulic pressure detected at the time of this (current) sampling may be (referred to as the maximum hydraulic pressure Pmax). Therefore, when the hydraulic pressure is sampled by the control pressure sensor 123, as long as the holding valve 83 is being opened, the detection hydraulic pressure Px at the time of this (current) sampling should not exceed the maximum hydraulic pressure Pmax.

Figure 9:
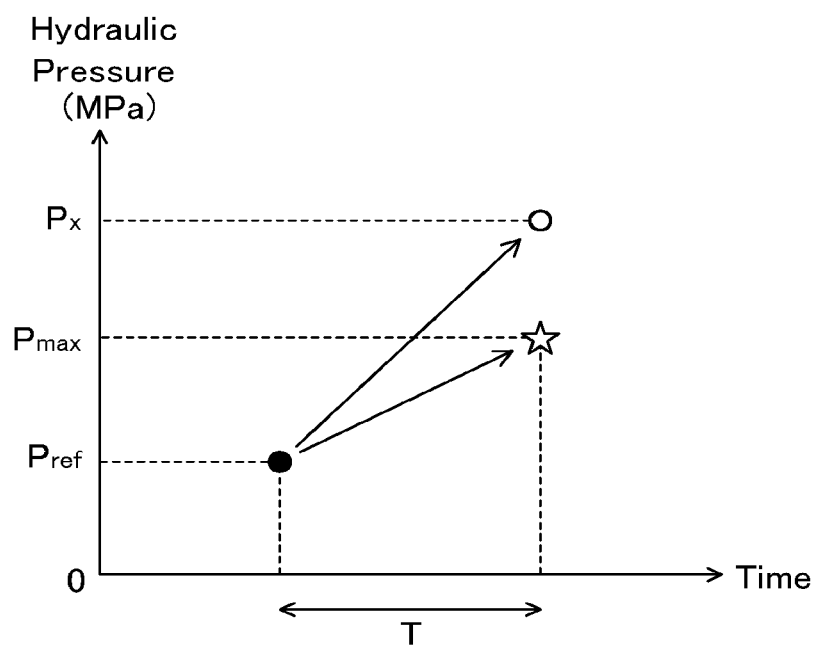
FIG. 9 is a graph for showing a relation between a maximum hydraulic pressure and a detection hydraulic pressure.

On the other hand, in a status that the holding valve 83 is closed, the volume of the hydraulic fluid passage of the downstream side of the pressure-increasing linear control valve 77 decreases, and the increase amount of the detection hydraulic pressure Px becomes larger with respect to the flow rate of the hydraulic fluid sent from the pressure-increasing linear control valve 77. That is, the increase amount of the detection hydraulic pressure Px with respect to a unit flow rate becomes larger. For this reason, as shown in FIG. 9, the detection hydraulic pressure Px exceeds the maximum hydraulic pressure Pmax. Thereby, it can be estimated that the holding valve 83 is in a closed status, i.e., the ABS control has been started at least.

In this example, although a case where the pressure-increasing linear control valve 77 is operated is being explained, a case where the pressure-reducing linear control valve 78 is operated can be also considered similarly. In this case, a flow rate is obtained by subtracting the multiplication value (T×Qmax) of the sampling-period T and the maximum flow rate Qmax of the pressure-reducing linear control valve 78 from the flow rate corresponding to the reference hydraulic pressure Pref, and the hydraulic pressure (referred to as the minimum hydraulic pressure Pmin) corresponding to this flow rate can be drawn by referring to the maximum pressure characteristic of the pressure-reducing linear control valve 78. Therefore, when the hydraulic pressure is sampled by the control pressure sensor 123, as long as the holding valve 83 is being opened, the detection hydraulic pressure Px at the time of this (current) sampling cannot be less than the minimum hydraulic pressure Pmin. On the other hand, in a status that the holding valve 83 is closed, the passage volume on the side of the wheel cylinder 52 from the pressure-reducing linear control valve 78 will decrease, and the reduction of the detection hydraulic pressure Px will become larger with respect to the flow rate of the hydraulic fluid discharged from the pressure-reducing linear control valve 78. That is, the reduction amount of the detection hydraulic pressure Px with respect to a unit flow rate becomes larger. For this reason, the detection hydraulic pressure Px becomes less than the minimum hydraulic pressure Pmin. Thereby, it can be estimated that the holding valve 83 is in a closed status, i.e., the ABS control has been started at least.

In addition, a case where the linear control valves 77 and 78 are not energized can be considered similarly. That is, by setting the maximum value (maximal flow) of the leak flow rate of the hydraulic fluid from the linear control valves 77 and 78 when the linear control valves 77 and 78 are not energized, it can be estimated that the ABS control has been started when the variation of the hydraulic pressure in a sampling period exceeds the value assumed from the maximal flow.

The first ECU120 has memorized maps representing the maximum flow characteristic as shown in FIG. 7 and the maximum hydraulic pressure characteristic as shown in FIG. 8. The maximum flow characteristic map has been memorized for each of the pressure-increasing linear control valve 77 and the pressure-reducing linear control valve 78. Moreover, since the maximum flow characteristic changes depending on the pressure difference between the downstream side and the upstream side of the linear control valves 77 and 78, the first ECU120 has memorized the maximum flow characteristic map for every pressure difference.

Figure 10:
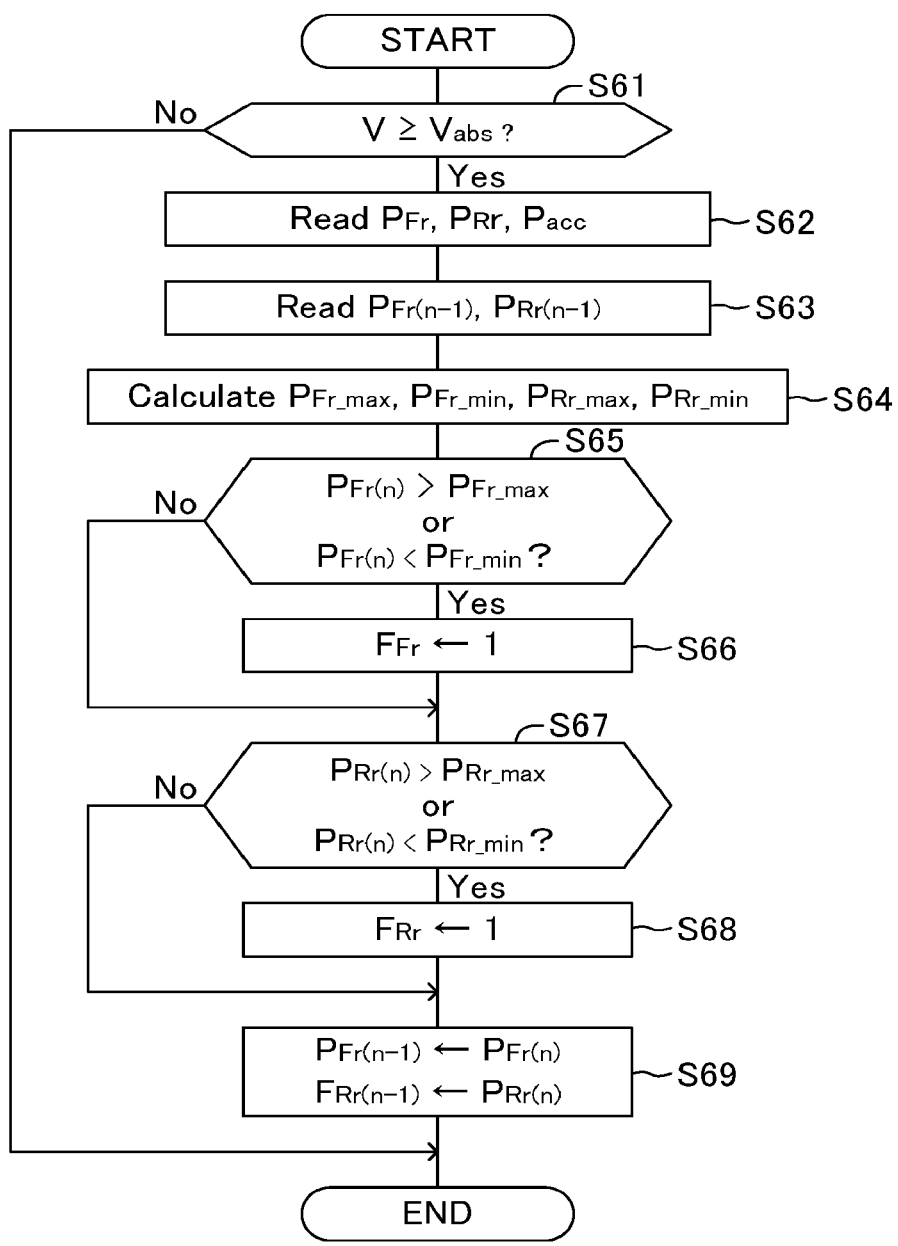
FIG. 10 is a flowchart for showing a second actuator operation start estimation routine.

Next, an operation start estimation treatment of the second actuator 210 which the first ECU120 performs will be explained. FIG. 10 shows a second actuator operation start estimation routine (hereafter, simply referred to as an operation start estimation routine) which the first ECU120 performs. The operation start estimation routine is repeatedly performed in parallel with the above-mentioned regeneration coordination brake control routine, in a predetermined short calculation period.

First, in step S61, the first ECU120 judges whether the vehicle speed V is equal to the ABS operation permit speed Vabs or higher, and once ends this routine since the ABS control and the VSC will not be carried out when the vehicle speed V is lower than the ABS operation permit speed Vabs. On the other hand, when the vehicle speed V is higher than the ABS operation permit speed Vabs, the first ECU120 reads the control pressure PFr and the control pressure PRr detected by the control pressure sensors 123Fr and 123Rr and the accumulator pressure Pam detected by the accumulator pressure sensor 121, in step S62. The control pressure PFr and the control pressure PRr read in this step S62 are referred to as the current control pressure PRr(n) and the current control pressure PFr(n). Then, in step S63, the first ECU120 reads the previous control pressure PRr(n−1) and the previous control pressure PFr (n−1) which were detected last time. Then, in step S64, referring to the maximum flow characteristic map and the maximum hydraulic pressure characteristic map, the first ECU120 calculates maximum hydraulic pressure PFr_max and minimum hydraulic pressure PFr_min of the front wheel braking system and maximum hydraulic pressure PRr_max and minimum hydraulic pressure PRr_min of the rear wheel braking system. As this calculation, the above-mentioned calculation may be carried out for the front wheel braking system and the rear wheel braking system, respectively. Since the maximum flow characteristic map has been set up for every pressure difference of the linear control valves 77 and 78, the pressure difference of the pressure-increasing linear control valve 77 is calculated using the accumulator pressure Pacc detected by the accumulator pressure sensor 121. As for the pressure-reducing linear control valve 78, the current control pressure PRr(n) and the current control pressure PFr(n) are the pressure differences.

Then, in step S65, the first ECU120 judges whether the current control pressure PFr(n) is larger than the maximum hydraulic pressure PFr_max or it is smaller than the minimum hydraulic pressure PFr_min. When the current control pressure PFr(n) is larger than the maximum hydraulic pressure PFr_max or smaller than the minimum hydraulic pressure PFr_min, it can be judged that the front wheel braking system of the second actuator 210 is operating. In this case, the first ECU120 sets the front wheel start estimation flag FFr to "1" in step S66. Moreover, when judged with "No" in step S65, the treatment in step S66 is skipped.

Then, in step S67, the first ECU120 judges whether the current control pressure PRr(n) is larger than the maximum hydraulic pressure PRr_max or it is smaller than the minimum hydraulic pressure PRr_min. When the current control pressure PRr(n) is larger than the maximum hydraulic pressure PRr_max or it is smaller than the minimum hydraulic pressure PRr_min, it can be judged that the rear wheel braking system of the second actuator 210 is operating. In this case, the first ECU120 sets the rear wheel start estimation flag FRr to "1" in step S68. Moreover, when judged with "No" in step S67, the treatment of step S68 is skipped.

Then, in step S69, the first ECU120 updates and memorizes the values of the current control pressure PFr(n) and the current control pressure PRr(n) as the values of the previous control pressure PRr(n-1) and the previous control pressure PFr(n-1), and once ends this routine. Therefore, at the time of the execution of the next operation start estimation routine, the updated and memorized values are used as the previous control pressure PFr(n-1) and the previous control pressure PRr(n-1) in step S63. In this case, instead of the judgment by comparing the control pressure PFr and the control pressure PRr at this time and those at the time of the last sampling, average values of the control pressure PFr and the control pressure PRr at a predetermined number of the most recent samplings may be used for the judgment by comparing them.

In addition, the front wheel start estimation flag FFr and the rear wheel start estimation flag FRr are set to "0" at the time of a start-up of the present routine, and in a case where they are set to "1" in step S66 or step S68, they will be reset to "0" after the status is maintained for a predetermined time or when the operation information transmitted from the second ECU220 is received within a predetermined time. This predetermined time is set to a value corresponding to a communication time required for transmitting information from the second ECU220 to the first ECU120 through the CAN communication line 300.

Since the operation start estimation routine is repeated in a calculation period shorter than the time required for transmitting the operation information from the second ECU220 to the first ECU120, the first ECU120 can judge that the second ECU220 starts its operation earlier than receiving the operation information.

Thus, in accordance with the present embodiment, the first ECU120 estimates the operation start of the second ECU220 based on the variations of the control pressures PFr and PRr. And, when the first ECU120 judges that the operation of the second ECU220 has been started by the estimation, without waiting for the reception of the operation information of the additional brake control transmitted from the second ECU220, the first ECU120 changes the control mode from the solo operation mode into the simultaneous operation mode (S17, S30), outputs an instruction for stopping the regenerative braking to the hybrid ECU8 (S35), and increases the target hydraulic pressure P* up to a pressure corresponding to the target total braking force F* (S36). Therefore, even in a configuration wherein the first ECU120 and the second ECU220 are connected with the CAN communication line 300, the hunching of the hydraulic pressure control of the first ECU120 due to the communication delay between both can be suppressed, and a stable hydraulic pressure can be supplied from the first actuator 110 to the second actuator 210. Moreover, the regenerative braking can be stopped at an early timing.

Figure 11:
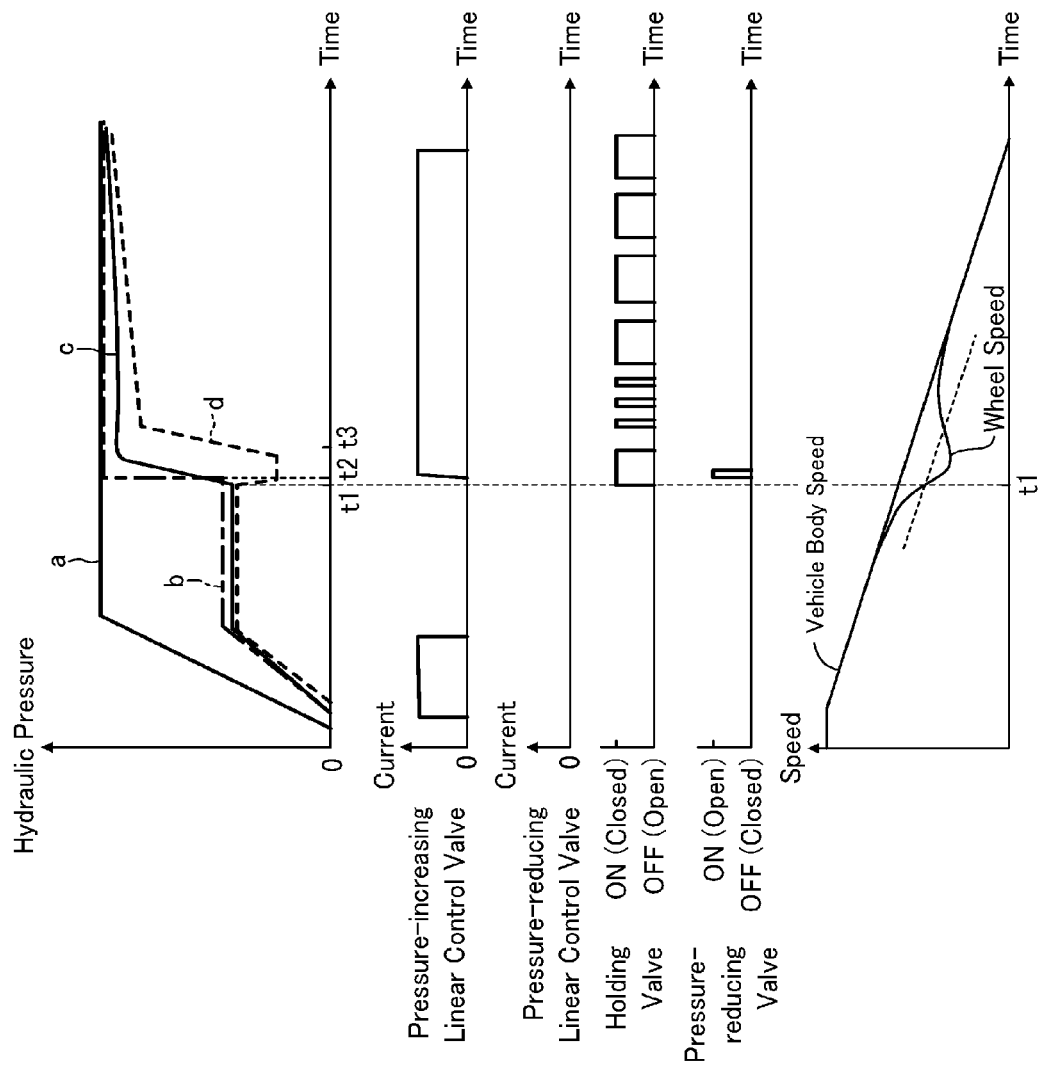
FIG. 11 is a graph for showing transition of a hydraulic pressure, a current, an opening-and-closing status of a valve, a vehicle body speed, and a wheel speed during the ABS operation in the present embodiment.
Figure 12:
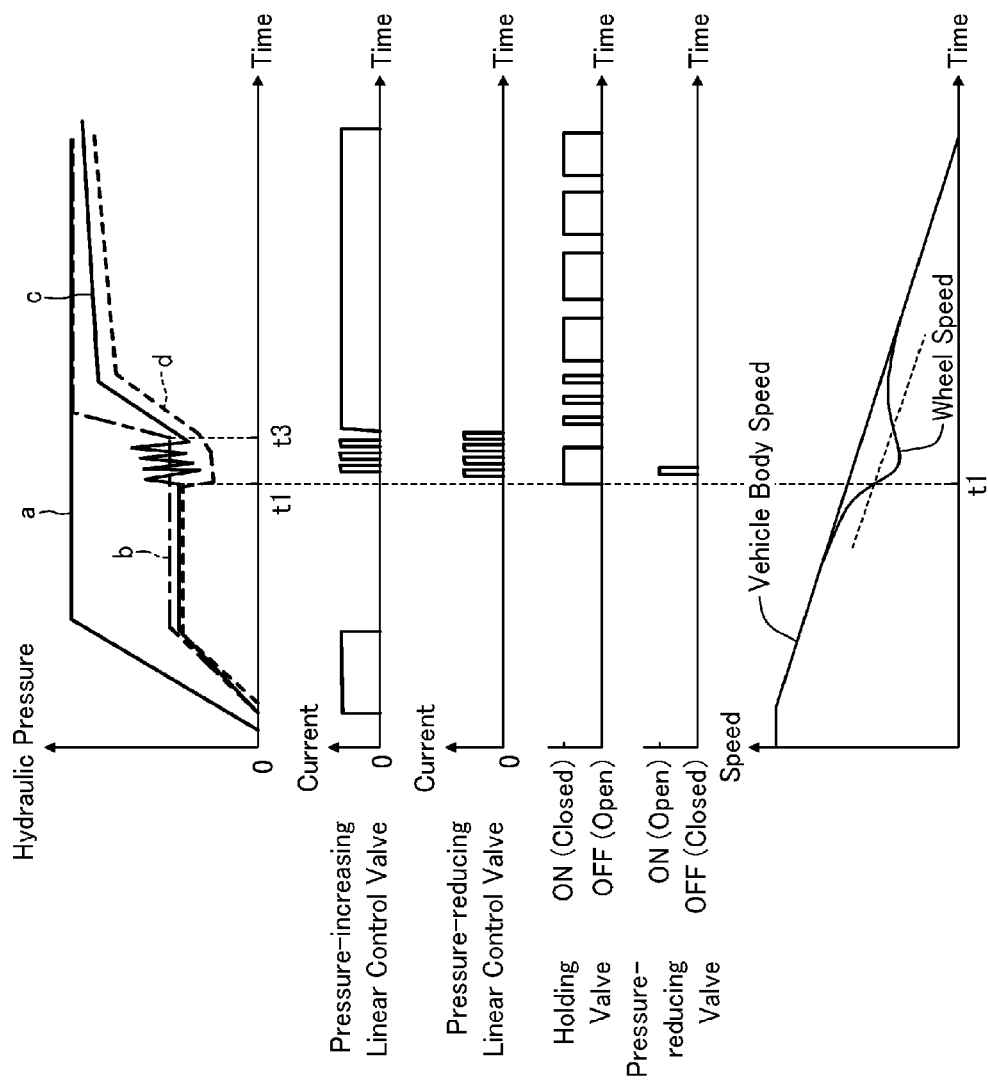
FIG. 12 is a graph for showing transition of a hydraulic pressure, a current, an opening-and-closing status of a valve, a vehicle body speed, and a wheel speed during the ABS operation in a comparative example.

FIG. 11 and FIG. 12 show images of transitions of the hydraulic pressure, the current of the pressure-increasing linear control valve 77, the current of the pressure-reducing linear control valve 78, the opening-and-closing status of the holding valve 83, the opening-and-closing status of the pressure-reducing valve 85, the vehicle speed, and a wheel speed at the time of the operation of an ABS. Although FIG. 11 shows a case of the brake apparatus according to the present embodiment, FIG. 12 shows a comparative example in which the first ECU120 does not estimate the operation of the second ECU 220 and stops the regenerative braking after waiting for the reception of the operation information. These drawings show the ABS operation of front wheels as representative examples.

In the graphs in the uppermost area of FIG. 11 and FIG. 12, the line "a" shows the value obtained by converting the demand braking force of the front wheels computed by the first ECU120 based of the operation amount of the brake pedal into the hydraulic pressure of the front wheel braking system (referred to as a converted hydraulic pressure corresponding to demand braking force). The line "b" shows the target hydraulic pressure PFr* of the front wheel braking system. The line "c" shows the control pressure PFr detected by the control pressure sensor 123Fr. The line "d" shows the hydraulic pressure of the wheel cylinder 52 of the front wheel in which the ABS control is carried out.

When detecting a brake pedal operation by a driver, the first ECU120 sets up the target hydraulic pressure PFr* corresponding to the braking force obtained by subtracting a portion of the regenerative braking force from the demand braking force by the driver, and starts the energization control of the linear control valve 77Fr and the pressure-reducing linear control valve 78 so that the control pressure PFr follows the target hydraulic pressure PRr*. And, at the time t1, when the deviation between the vehicle speed and the wheel speed exceeds an ABS control start threshold value, the second ECU220 starts the ABS control and transmits ABS operation information to the first ECU120 through the CAN communication line 300. This ABS operation information does not reach the first ECU120 at this time.

When the ABS control is started, the second ECU220 first closes the holding valve 83 of the target wheel for the ABS control and, next, temporarily opens the pressure-reducing valve 85 to reduce the hydraulic pressure of the wheel cylinder 52. Then, it repeatedly closes and opens the holding valve 83, and returns the hydraulic pressure of the wheel cylinder 52 back to the supply pressure (hydraulic pressure supplied from the first actuator 110). At the time of the operation start of the ABS, the behavior of the wheel cylinder pressure as the target for the ABS control is not consistent with the behavior of the control pressure PFr.

When the holding valve 83 is closed for the first time after the ABS control has been started, the hydraulic pressure in the first actuator 110 may rise suddenly. In this case, in the comparative example (FIG. 12), the pressure-reducing linear control valve 78Fr operates by hydraulic pressure control of first ECU120 to reduce the pressure. In a status that the holding valve 83 is closed, since the volume of the hydraulic fluid passage to which the hydraulic pressure is supplied from the pressure-increasing linear control valve 77Fr and the pressure-reducing linear control valve 78Fr has decreased, the hydraulic pressure rigidity in the passage changes and the change of the hydraulic pressure becomes large with respect to the operation of the pressure-increasing linear control valve 77Fr or the pressure-reducing linear control valve 78Fr. For this reason, in the comparative example (FIG. 12), the detected control pressure PFr vibrates up and down with respect to the target hydraulic pressure PFr*, and the pressure-increasing linear control valve 77Fr and the pressure-reducing linear control valve 78Fr operate in turns in a short period. And, after it comes to time t3 when the ABS operation information reaches the first ECU120, the target hydraulic pressure PFr* is set up to be increase and the pressure-increasing by the pressure-increasing linear control valve 77Fr is started. For this reason, at the beginning of the operation of the ABS, it becomes difficult to feed a stable hydraulic pressure from the first actuator 110 to the second actuator 210. As a result, a climb gradient of the wheel cylinder pressure, which is a target to be achieved, cannot be acquired.

On the contrary in a the present embodiment (FIG. 11), when the ABS control is started by the second ECU220 at the time t1, the first ECU120 judges by estimation that the second actuator 210 starts its operation at the time t2, based on the increase in the control pressure PFr, and switches the control mode from the solo operation mode to the simultaneous operation mode. For this reason, without waiting for a reception of ABS operation information, as shown in FIG. 11, the target hydraulic pressure PFr* is set up to be increased up to the converted hydraulic pressure corresponding to demand braking force, and the controlled parameter is changed. Thereby, switching between the pressure-increasing operation by the pressure-increasing linear control valve 77Fr and the pressure-reducing operation by the pressure-reducing linear control valve 78Rr is suppressed, and the pressure-increasing linear control valve 77Fr is maintained in an opened status. For this reason, a stable hydraulic pressure can be supplied to the second actuator 210 from the beginning of the operation of the ABS, and the wheel cylinder pressure can be returned to the supply pressure early at the target climb gradient.

In accordance with the brake apparatus of the present embodiment explained above, since the first ECU120 estimates the operation start of the second actuator 210 based on the variation of the hydraulic pressure outputted from the first actuator 110 to the second actuator 210, even without waiting for the reception of the operation information transmitted from the second ECU220, the control mode can be switched from the solo operation mode to the simultaneous operation mode. Thereby, the hybrid ECU8 can be instructed to stop the regenerative braking at an early stage. Moreover, in the first actuator 110, switching between the pressure-increasing operation of the pressure-increasing linear control valve 77 and the pressure-reducing operation of the pressure-reducing linear control valve 78 in a short period can be suppressed. Thereby, reduction of the operation noise of the pressure-increasing linear control valve 77 and the pressure-reducing linear control valve 78 can be attained. Moreover, the durability of the pressure-increasing linear control valve 77 and the pressure-reducing linear control valve 78 can be improved. Moreover, since the hydraulic pressure supplied from the first actuator 110 to the second actuator 210 can be early raised, the climb gradient of the hydraulic pressure of the wheel cylinder 52 can be made proper, and the stopping distance of the vehicle at the time of the execution of the ABS control can be shortened, in the second actuator 210. Moreover, a behavior stabilization of the vehicle can be performed successfully.

Moreover, since it is judged that the operation of the second actuator 210 has been started when the variation of the hydraulic pressure with respect to the flow rate of the hydraulic fluid outputted from the first actuator 110 becomes a value which cannot happen when the second actuator 210 is not operating, it is possible to easily estimate that the operation of the second actuator 210 has been started. In particular, since the existence of a operation start of the second actuator 210 is estimated by setting up the maximum value and minimum value which the hydraulic pressure can be (maximum hydraulic pressure Pmax and minimum hydraulic pressure Pmin) and comparing the control pressure PFr and PRr with the maximum hydraulic pressure Pmax and minimum hydraulic pressure Pmin while the variation in a flow characteristic and the variation in flow-rate-pressure characteristic are taken into consideration, the estimation accuracy is high.

Moreover, since the first hydraulic pressure control unit 100 which performs the regeneration coordination brake control and the second hydraulic pressure control unit 200 which performs the additional brake control are prepared separately and independently, versatility of each control unit becomes higher. For instance, in a conventionally known brake apparatus used for a hybrid vehicle, a hydraulic pressure control unit exclusive for a hybrid vehicle, comprising an integral-type actuator, which performs both a regeneration coordination brake control and an additional brake control, and one ECU which controls the integral-type actuator is prepared. The optimal valve characteristic (diameter of an orifice, and responsiveness to a current) for adjusting the pressure of a hydraulic fluid in a regeneration coordination brake control is different from the optimal valve characteristic (diameter of an orifice, and responsiveness to a current) in an additional brake control, such as an ABS control, etc. Moreover, the optimal valve characteristic differs also depending on vehicle weights. For this reason, in accordance with the above-mentioned integral-type actuator, the range of vehicles on which it can be mounted will be limited. On the contrary, the present embodiment can be applied to various vehicles (vehicle weight) by selectively combining the first hydraulic pressure control unit 100 specialized in the regeneration coordination brake control and the second hydraulic pressure control unit 200 specialized in the additional brake control according to a vehicle characteristic. Moreover, the actuators 110 and 210 or the ECUs 120 and 220 can be combined suitably as one component, not by the unit. Moreover, as for the second actuator 210, that applied to a vehicle which do not perform a regenerative braking can be diverted as it is, and no modification of the hardware for mounting it on a hybrid vehicle is necessary. Moreover, also as for the master cylinder unit 40, an existing one can be diverted as it is. Moreover, since it is configured so that the first ECU120 takes charge of the calculation treatment relating to the regeneration coordination brake control and the second ECU220 takes charge of the calculation treatment relating to the additional brake control, the calculation load of a microcomputer in each of the ECU120 and ECU220 can be reduced.

As mentioned above, although the brake apparatus according to the embodiments and the modifications were explained, the present invention is not limited to the above-mentioned embodiments and modifications, and unless it deviates from the objective of the present invention, various modifications are possible.

Although the brake apparatus according to the present embodiment is applied to a front-wheel-drive-type hybrid vehicle, for instance, it may be applied to a rear-wheel-drive-type vehicle or a four-wheel-drive-type hybrid vehicle. Moreover, it is also applicable to an electric vehicle which comprises only a motor as a power source for vehicle running (which does not have an internal-combustion engine). That is, the present invention can be applied to any vehicles which can generate regenerative braking force by a motor.

Moreover, although the maximal flow rate is calculated based on the maximum flow characteristic map in the present embodiment, the maximum flow rate of the hydraulic fluid sent out from the pressure-increasing linear control valve 77 may be computed from the variation of the accumulator pressure Pacc and an accumulator pressure capacity, if in a status that the pressure-increasing linear control valve 77 is being energized, for instance.

Moreover, although the first ECU120 transmits a stop instruction of regenerative braking to the hybrid ECU8 (S35), when the second actuator 210 starts its operation, or when the operation start of the second actuator 210 is estimated, in the present embodiment, the regenerative braking does not necessarily need to be stopped, and an instruction for reducing the regenerative braking force may be transmitted. In this case, the first ECU120 may be configured to increase the target friction braking force Fb* only by the amount corresponding to the reduction instruction of regenerative braking force in step S36. Since the target hydraulic pressure PFr* and PRr* can be increased also thereby, the above-mentioned effect can be acquired.

Moreover, the detected control pressure PFr (or PRr) may be corrected to a value obtained by lowering it by a predetermined value Pa at the time of starting the execution of the simultaneous operation mode (PFr=PFr−Pa or PRr=PRr−Pa). Thereby, the deviation between the target hydraulic pressure and the detection hydraulic pressure can be increased to certainly start the pressure-increasing operation by the pressure-increasing linear control valve 77. When the ABS control has been started, since the hydraulic pressure of the wheel cylinder 52 is lower than the control pressure PFr (or PRr), it is preferable that this decrease in the hydraulic pressure is used as the predetermined value Pa. Moreover, the feedback control gain of the hydraulic pressure may be changed at the time of starting the execution of the simultaneous operation mode.

Moreover, it is not necessary to perform all the things shown in the embodiments as an additional brake control, and only an ABS control has to be included at least.

Figure 14:
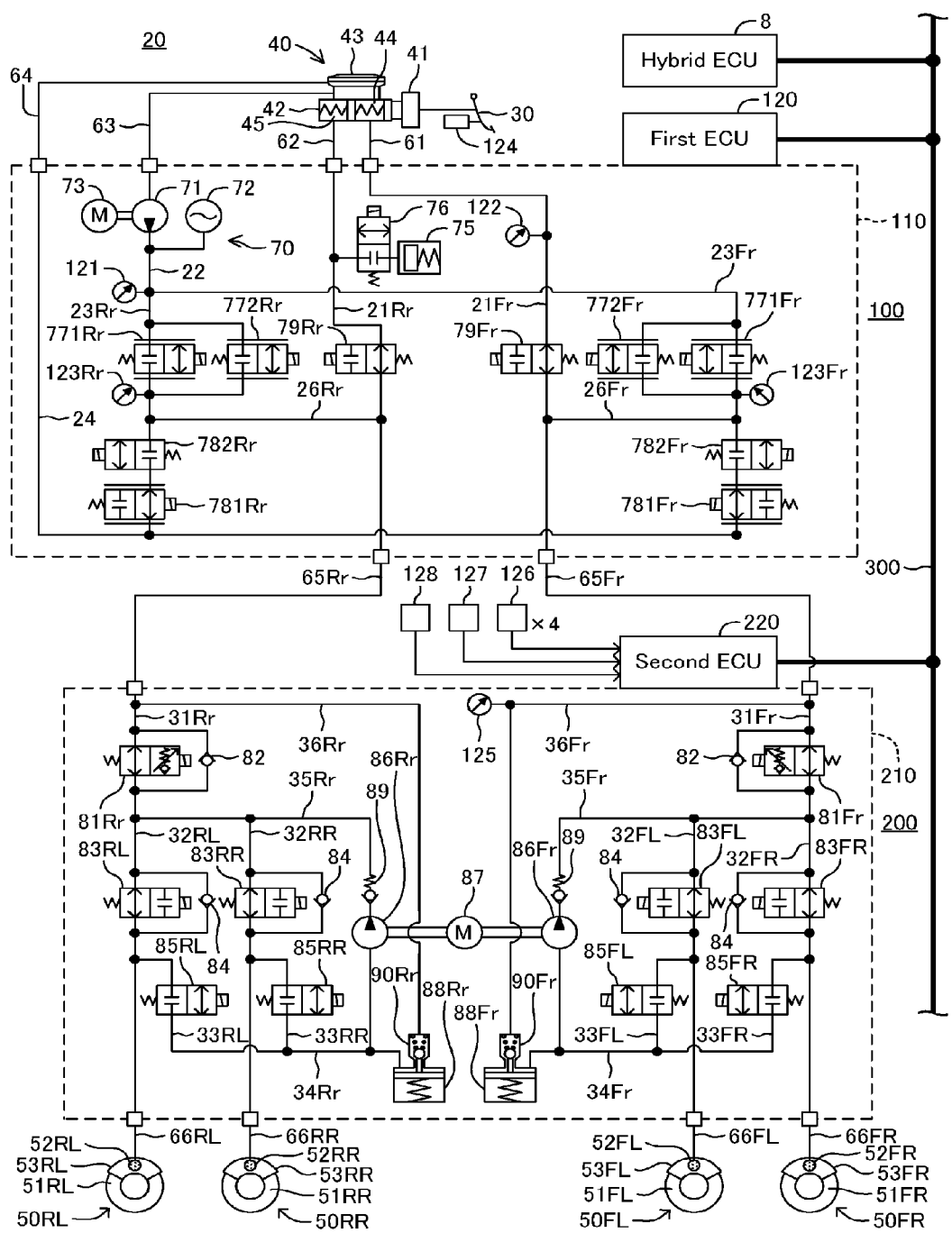
FIG. 14 is a schematic configuration diagram of a hydraulic brake system as a modification.

Moreover, also as for the hydraulic pressure circuit configuration of the first actuator 110 and the second actuator 210, for example, the arrangement of an electromagnetic valve, the type (normally-closed, normally-open) of an electromagnetic valve, the number of electromagnetic valves, the location of a pressure sensor, etc. can be changed arbitrarily. In the embodiment, although the pressure-reducing linear control valves 78Fr and 78Rr of the first actuator 110 are normally-closed type, when a normally-closed linear control valve is used, a vibration is likely to occur when a brake pedal operation is canceled. Then, as shown in FIG. 14, normally-open type pressure-reducing linear control valves 781Fr and 781Rr may be used to reduction the vibration. In this case, it is preferable that the normally-closed electromagnetic on-off valves 782Fr and 782Rr are prepared in series with the pressure-reducing linear control valves 781Fr and 781Rr, as the measures against a failure thereof.

Moreover, as shown in FIG. 14, a pressure-increasing linear control valve 771Fr and a second pressure-increasing linear control valve 772Fr may be disposed in parallel in the branch hydraulic pressure source passage 23Fr, and a first pressure-increasing linear control valve 771Rr and a second pressure-increasing linear control valve 772Rr may be disposed in parallel in the branch hydraulic pressure source passage 23Rr, and thereby their durability may be improved.

Moreover, as shown in FIG. 14, a stroke simulator 75 may be disposed in the main passage 21Rr, in place of the main passage 21Fr. Moreover, also as for the master pressure sensor 122 may be disposed in any one or both of the main passage 21Fr and the main passage 21Rr, as long as it is upstream side rather than the master cut valve 79.

The invention claimed is:

1. A brake apparatus applied to a vehicle comprising a regenerative braking device to generate regenerative braking force by converting a kinetic energy of a rotating wheel into an electrical energy and collecting the electrical energy to a battery, comprising:

a master cylinder which outputs a hydraulic pressure of a hydraulic fluid according to a brake operation by a driver, a wheel cylinder which is disposed for each wheel and operates a friction member with the hydraulic pressure of the hydraulic fluid to generate friction braking force, a first actuator which is disposed in a passage of the hydraulic fluid between said master cylinder and said wheel cylinder and can adjust the hydraulic pressure supplied to said wheel cylinder, a first electronic control unit which sets up target hydraulic pressure so that the sum of said regenerative braking force and said friction braking force becomes equal to target total braking force set up according to the amount of a brake operation, and controls an operation of said first actuator so that the outputted hydraulic pressure of said first actuator follows said target hydraulic pressure, a second actuator which is disposed in a passage of the hydraulic fluid between said first actuator and said wheel cylinder, supplies the hydraulic pressure outputted from said first actuator to said wheel cylinder as it is when being not in operation, and can individually adjust the hydraulic pressure of each wheel cylinder when being in operation, a second electronic control unit which controls an operation of said second actuator to carry out an antilock control for suppressing the lock of a wheel at least, and a communication connection means to connect said first electronic control unit and said second electronic control unit so that they can communicate each other, and said first electronic control unit changes the control mode into a control mode on the assumption that said second actuator is operating, when said first electronic control unit receives operation information which shows that said second actuator is operating and is transmitted from said second electronic control unit, wherein:

said first electronic control unit comprises an early control mode changing means for changing the control mode into said control mode on the assumption that said second actuator is operating, without waiting for the reception of said operation information, when the variation of the outputted hydraulic pressure of said first actuator is a value which cannot happen while said second actuator is not operating.

2. The brake apparatus according to claim 1, comprising an operation start estimation means to estimate that the operation of said second actuator is started, when the variation of the hydraulic pressure with respect to the flow rate of the hydraulic fluid outputted from said first actuator becomes a value which cannot happen while said second actuator is not operating, wherein:
said early control mode changing means changes the control mode into said control mode on the assumption that said second actuator is operating, when said operation start estimation means estimates that the operation of said second actuator is started.

3. The brake apparatus according to claim 2, wherein:
said operation start estimation means judges whether the variation of the hydraulic pressure with respect to the flow rate of the hydraulic fluid outputted from said first actuator is larger than an assumed maximum value of the variation of the hydraulic pressure with respect to the flow rate of the hydraulic fluid outputted from said first actuator in a status that said first actuator and said wheel cylinder are communicating with each other and, based on the judgment result, estimates whether the operation of said second actuator has been started.

4. The brake apparatus according to claim 1, wherein:
said first electronic control unit carries out a treatment for reducing the regenerative braking by said regenerative braking device by changing the control mode into said control mode on the assumption that said second actuator is operating.

5. The brake apparatus according to claim 1, wherein:
said first electronic control unit increases said target hydraulic pressure by changing the control mode into said control mode on the assumption that said second actuator is operating.

6. The brake apparatus according to claim 1, wherein:
said first actuator comprises a power hydraulic pressure generator which comprises a pump and an accumulator and outputs high-pressure hydraulic pressure, a linear control valve which adjusts and outputs the hydraulic pressure outputted from said power hydraulic pressure generator, and a pressure sensor which detects the hydraulic pressure adjusted by said linear control valve, and
said first electronic control unit acquires a detection hydraulic pressure detected by said pressure sensor, carries out the drive control of said linear control valve with a current according to the deviation between said detection hydraulic pressure and said target hydraulic pressure, and changes a controlled parameter so that switching between a pressure-increasing operation and a pressure-reducing operation of said linear control valve is suppressed as compared with the previous control mode, by changing the control mode into said control mode on the assumption that said second actuator is operating.

* * * * *